(12) United States Patent
Toda

(10) Patent No.: US 7,221,790 B2
(45) Date of Patent: May 22, 2007

(54) PROCESSING FOR ACCURATE REPRODUCTION OF SYMBOLS AND OTHER HIGH-FREQUENCY AREAS IN A COLOR IMAGE

(75) Inventor: Yukari Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/246,301

(22) Filed: Oct. 11, 2005

(65) Prior Publication Data

US 2006/0029280 A1  Feb. 9, 2006

Related U.S. Application Data

(62) Division of application No. 09/902,172, filed on Jul. 11, 2001, now Pat. No. 6,999,619.

(30) Foreign Application Priority Data

Jun. 26, 2001 (JP) .............................. 2001/193640
Jul. 12, 2005 (JP) .............................. 2000/211377

(51) Int. Cl.
*G06K 9/00* (2006.01)
*G06K 9/36* (2006.01)

(52) U.S. Cl. ..................................... 382/162

(58) Field of Classification Search ................ 382/162, 382/165, 168, 172, 199, 251, 256, 264, 272; 358/2.1, 3.21, 3.06, 466, 500
See application file for complete search history.

(56) References Cited

U.S. PATENT DOCUMENTS 4,707,745 A * 11/1987 Sakano ....................... 358/2.1
4,723,173 A    2/1988 Tanioka ..................... 358/3.21
4,899,194 A    2/1990 Hori ............................ 355/56
4,931,881 A    6/1990 Matsui et al. ................ 358/466
4,982,437 A *  1/1991 Loriot ......................... 382/111

(Continued)

FOREIGN PATENT DOCUMENTS

EP   0 731 599 A2   9/1996
EP   0 886 242 A1   12/1998
EP   1 006 476 A2   6/2000

OTHER PUBLICATIONS

Tominaga, S., "A Color Classification Method for Color Images Using a Uniform Color Space", Institute of Electrical and Electronics Engineers, Proceedings of the Inte'l Conf. on Pattern Recognition, Atlantic City, Jun. 16-21, 1990, Conf. A: Computer Vision; and Conf. B: Pattern Recognition Systems and Applications, Los Alamitos, IEEE Comp. Soc. Press, US. vol. 1, Conf. 10, pp. 803-807.

(Continued)

*Primary Examiner*—Amir Alavi
(74) *Attorney, Agent, or Firm*—Ftizpatrick, Cella, Harper & Scinto

(57) ABSTRACT

In an image processing apparatus, color image data is binarized, and a symbol area in the color image data is detected. There are obtained, from N colors that form a symbol in the symbol area, M colors that are equal to or smaller than N in number. A symbol cutting process is performed on the symbol area, and one of the M colors is allocated for each symbol cut unit that is obtained by the symbol cutting.

3 Claims, 44 Drawing Sheets

U.S. PATENT DOCUMENTS

| | | | | |
|---|---|---|---|---|
| 5,309,228 A | * | 5/1994 | Nakamura | 358/500 |
| 5,748,797 A | * | 5/1998 | Sakai et al. | 382/256 |
| 5,778,092 A | | 7/1998 | MacLeod et al. | 382/176 |
| 5,809,165 A | | 9/1998 | Massen | 382/168 |
| 5,841,899 A | | 11/1998 | Ide et al. | 382/168 |
| 5,845,007 A | | 12/1998 | Ohashi et al. | 382/199 |
| 5,933,524 A | | 8/1999 | Schuster et al. | 382/168 |
| 6,173,088 B1 | | 1/2001 | Koh et al. | 382/289 |
| 6,473,522 B1 | | 10/2002 | Lienhart et al. | 382/168 |
| 6,486,981 B1 | | 11/2002 | Shimura et al. | 358/500 |
| 6,504,950 B1 | * | 1/2003 | Murashita et al. | 382/162 |
| 2001/0053248 A1 | | 12/2001 | Maeda | 382/165 |
| 2004/0202377 A1 | * | 10/2004 | Murakami | 382/251 |
| 2005/0135671 A1 | * | 6/2005 | Levin et al. | 382/162 |

OTHER PUBLICATIONS

Dolan, J.f et al., "Segmentation for Digital Copying and Compression", Sharp Technical Journal, Sharp Co., Nara-ken, Japan, No. 76, Apr. 2000, pp. 28-35.

* cited by examiner

SUBJECT COPY IMAGE

BRIGHTNESS HISTOGRAM

FIG. 5

振込や入金確認をデスクのパソコンで　　PR
パソコンバンキングを身近にする
ANSER-SPC

あいうえおかきくけこさしすせそたちつてとなにぬねのはひふへほまみむめもやいゆえよら
りるれろわいうえをんあいうえおかきくけこさしすせそたちつてとなにぬねのはひふへほま
みむめもやいゆえよらりるれろわいうえをんあいうえおかきくけこさしすせそたちつてとな
にぬねのはひふへほまみ

愛上緒書きくけ個差し巣
愛上緒カキクケコ

こさしすせそたちつてとなにぬね
のはひふへほまみむめもやいゆえ
よらりるれろわいうえをんあいう
えおかきくけこさしすせそたちつ
てとなにぬねのはひふへほまみあ
いうえおかきくけこさし
ちつてとなにぬねのはひふへほま
みむめもやいゆえよらりるれろわ
いうえをんあいうえおかきくけこ
さしすせそたちつてとなにぬねの
はひふへほまみむめもやいゆえよ
らりるれろわいうえをんあいうえ
おかき
となにぬねのはひふへほまみあい
うえおかきくけこさしすせそたち
つてとなにぬねのはひふへほまみ

あいうえおかきくけこさしすせそ
たちつてとなにぬねのはひふへほ
まみむめもやいゆえよらりるれろ
わいうえをんあいうえおかきくけ
こさしすせそたちつてとなにぬね
のはひふへほまみむめもや

神奈川県に台風が近付いて
いる今日この頃で有ります

ちつてとなにぬねのはひふへほま
みむめもやいゆえよらりるれろわ
いうえをんあいうえおかきくけこ
さしすせそたちつてとなにぬねの
はひふへほまみむめもやいゆえよ
らりるれろわいうえをん
おかきくけこさしすせそたちつて
となにぬねのはひふへほまみあい
うえおかきくけこさしすせそたち
つてとなにぬねのはひふへほまみ

あいうえおかきくけこさしすせそ
たちつてとなにぬねのはひふへほ
まみむめもやいゆえよらりるれろ
わいうえをんあいうえおかきくけ
こさしすせそたちつてとなにぬね

東京都墨田区荒川
神奈川県横浜市都筑区

いうえおかきくけこさしすせそた
ちつてとなにぬねのはひふへほま
みむめもやいゆえよらりるれろわ
いうえをんあいうえおかきくけこ
さしすせそたちつてとなにぬねの
はひふへほまみむめもや
らりるれろわいうえをんあいうえ
おかきくけこさしすせそたちつて
となにぬねのはひふへほまみあい
うえおかきくけこさしすせそたち
つてとなにぬねのはひふへほまみ
むめもやいゆえよらりるれろわい
うえをんあいうえおかきくけこさ
しすせそたちつてとなにぬねのは
ひふへほまみむめもや
りるれろわいうえをんあいうえお
かきくけこさしすせそたちつてと
なにぬねのはひふへほまみあいう
えおかきくけこさしすせそたちつ
てとなにぬねのはひふへほま
めもやいゆえよらりるれろわいう
えをんあいうえおかきくけこさし
すせそたちつてとなにぬねのはひ
ふへほまみむめもやいゆえよらり
るれろわいうえをんあいうえお

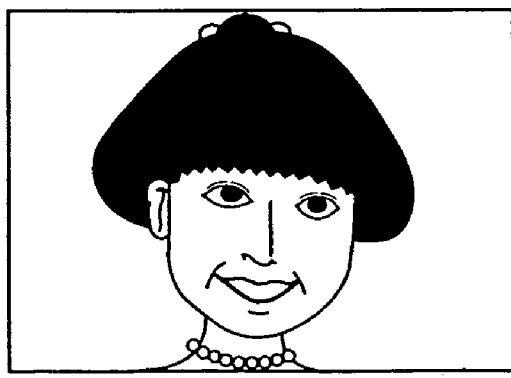

りるれろわい
かきくけこさ
なにぬねのは
やいゆえよら
んあいうえお
そたちつてと
ほまみあいう
すせそたちつ
ふへほまみむ
るれろ
きくけこさし
にぬねのはひ
いゆえよらり
あいうえおか

AB CDEFGHIJK LMNOPQ RS　　　　AB CDEFGHIJK LMNOPQ RS あいうえおかきくけこさしすせそた

AB

BINARY IMAGE K

パソコンバンキングを身近にする
ANSER-SPC

あいうえおかきくけこさしすせそたちつてとなにぬねのはひふへほまみむめもやいゆえよらりるれろわいうえをんあいうえおかきくけこさしすせそたちつてとなにぬねのはひふへほまみむめもやいゆえよらりるれろわいうえをんあいうえおかきくけこさしすせそたちつてとなにぬねのはひふへほまみ

愛上緒書きくけ個差し巣
愛上緒カキクケコ

こさしすせそたちつてとなにぬねのはひふへほまみむめもやいゆえよらりるれろわいうえをんあいうえおかきくけこさしすせそたちつてとなにぬねのはひふへほまみあいうえおかきくけこさし
ちつてとなにぬねのはひふへほまみむめもやいゆえよらりるれろわいうえをんあいうえおかきくけこさしすせそたちつてとなにぬねのはひふへほまみむめもやいゆえよらりるれろわいうえをんあいうえおかき
となにぬねのはひふへほまみあいうえおかきくけこさしすせそたちつてとなにぬねのはひふへほまみ

あいうえおかきくけこさしすせそたちつてとなにぬねのはひふへほまみむめもやいゆえよらりるれろわいうえをんあいうえおかきくけこさしすせそたちつてとなにぬねのはひふへほまみむめもや

神奈川県に台風が近付いている今日この頃で有ります

ちつてとなにぬねのはひふへほまみむめもやいゆえよらりるれろわいうえをんあいうえおかきくけこさしすせそたちつてとなにぬねのはひふへほまみむめもやいゆえよらりるれろわいうえをんおかきくけこさしすせそたちつてとなにぬねのはひふへほまみあいうえおかきくけこさしすせそたちつてとなにぬねのはひふへほまみ
りるれろわい
かきくけこさ
なにぬねのは
やいゆえよら
んあいうえお
そたちつてと
ほまみあいう
すせそたちつ
ふへほまみむ
るれろ
きくけこさし
にぬねのはひ
いゆえよらり
あいうえおか

あいうえおかきくけこさしすせそたちつてとなにぬねのはひふへほまみむめもやいゆえよらりるれろわいうえをんあいうえおかきくけこさしすせそたちつてとなにぬね

東京都墨田区荒川
神奈川県横浜市都筑区

いうえおかきくけこさしすせそたちつてとなにぬねのはひふへほまみむめもやいゆえよらりるれろわいうえをんあいうえおかきくけこさしすせそたちつてとなにぬねのはひふへほまみむめもや
らりるれろわいうえをんあいうえおかきくけこさしすせそたちつてとなにぬねのはひふへほまみあいうえおかきくけこさしすせそたちつてとなにぬねのはひふへほまみむめもやいゆえよらりるれろわいうえをんあいうえおかきくけこさしすせそたちつてとなにぬねのはひふへほまみむめもや
りるれろわいうえをんあいうえおかきくけこさしすせそたちつてとなにぬねのはひふへほまみあいうえおかきくけこさしすせそたちつてとなにぬねのはひふへほまめもやいゆえよらりるれろわいうえをんあいうえおかきくけこさしすせそたちつてとなにぬねのはひふへほまみむめもやいゆえよらりるれろわいうえをんあいうえお

AB CDEFGHIJK LMNOPQ RS　　　　AB CDEFGHIJK LMNOPQ RS あいうえおかきくけこさしすせそた

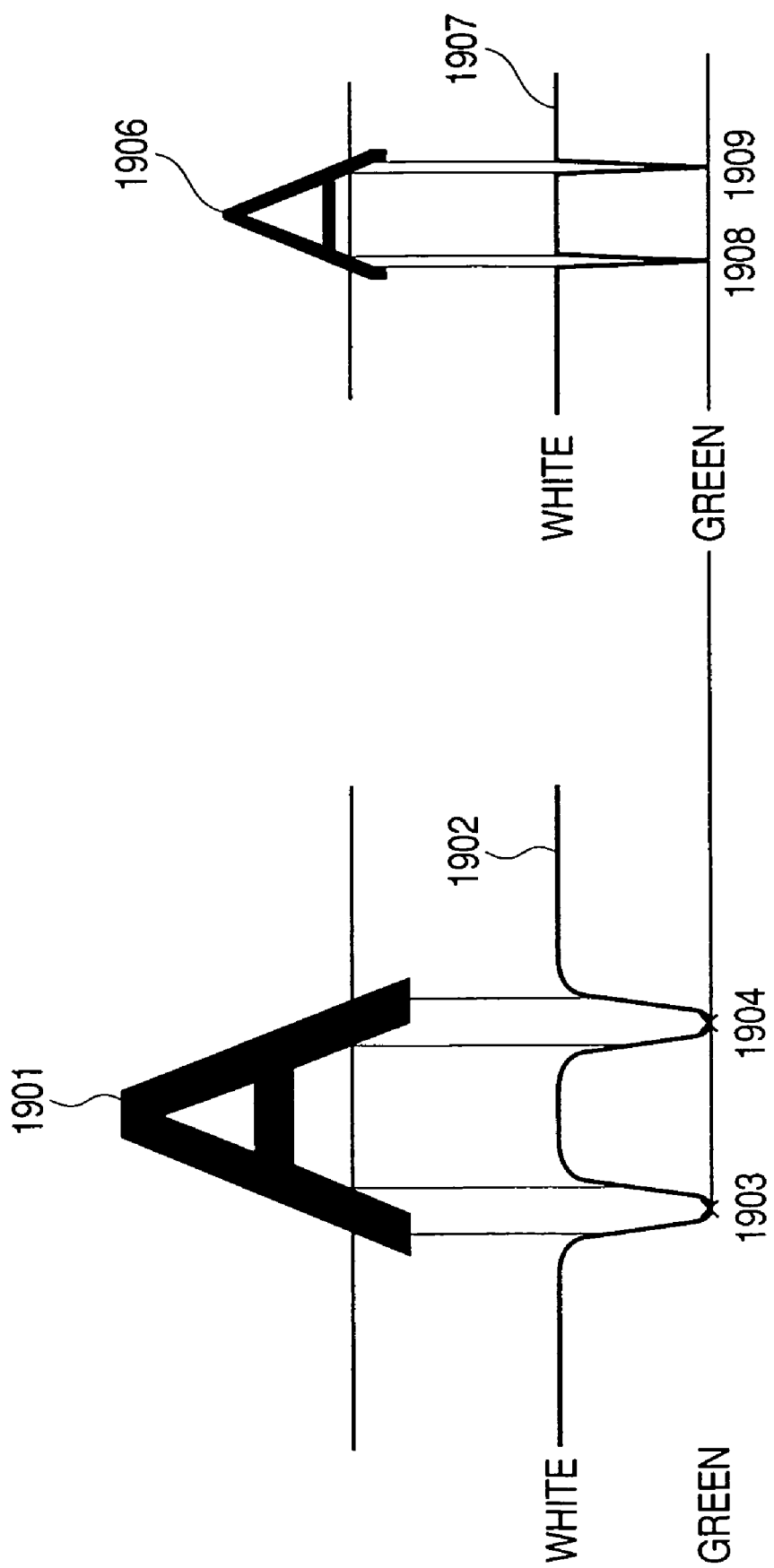

BRIGHTNESS HISTOGRAM

パソコンバンキングを身近にする
ANSER-SPC

あいうえおかきくけこさしすせそたちつてとなにぬねのはひふへほまみむめもやいゆえよらりるれろわいうえをんあいうえおかきくけこさしすせそたちつてとなにぬねのはひふへほまみむめもやいゆえよらりるれろわいうえをんあいうえおかきくけこさしすせそたちつてとなにぬねのはひふへほまみ

愛上緒書きくけ個差し巣
愛上緒カキクケコ

こさしすせそたちつてとなにぬねのはひふへほまみむめもやいゆえよらりるれろわいうえをんあいうえおかきくけこさしすせそたちつてとなにぬねのはひふへほまみあいうえおかきくけこさし
ちつてとなにぬねのはひふへほまみむめもやいゆえよらりるれろわいうえをんあいうえおかきくけこさしすせそたちつてとなにぬねのはひふへほまみむめもやいゆえよらりるれろわいうえをんあいうえおかき
となにぬねのはひふへほまみあいうえおかきくけこさしすせそたちつてとなにぬねのはひふへほまみ

あいうえおかきくけこさしすせそたちつてとなにぬねのはひふへほまみむめもやいゆえよらりるれろわいうえをんあいうえおかきくけこさしすせそたちつてとなにぬねのはひふへほまみむめもや

神奈川県に台風が近付いている今日この頃で有ります

ちつてとなにぬねのはひふへほまみむめもやいゆえよらりるれろわいうえをんあいうえおかきくけこさしすせそたちつてとなにぬねのはひふへほまみむめもやいゆえよらりるれろわいうえをん
おかきくけこさしすせそたちつてとなにぬねのはひふへほまみあいうえおかきくけこさしすせそたちつてとなにぬねのはひふへほまみ
りるれろわい
かきくけこさ
なにぬねのは
やいゆえよら
んあいうえお
そたちつてと
ほまみあいう
すせそたちつ
ふへほまみむ
るれろ
きくけこさし
にぬねのはひ
いゆえよらり
あいうえおか

あいうえおかきくけこさしすせそたちつてとなにぬねのはひふへほまみむめもやいゆえよらりるれろわいうえをんあいうえおかきくけこさしすせそたちつてとなにぬね

東京都墨田区荒川
神奈川県横浜市都筑区

いうえおかきくけこさしすせそたちつてとなにぬねのはひふへほまみむめもやいゆえよらりるれろわいうえをんあいうえおかきくけこさしすせそたちつてとなにぬねのはひふへほまみむめもやらりるれろわいうえをんあいうえおかきくけこさしすせそたちつてとなにぬねのはひふへほまみあいうえおかきくけこさしすせそたちつてとなにぬねのはひふへほまみむめもやいゆえよらりるれろわいうえをんあいうえおかきくけこさしすせそたちつてとなにぬねのはひふへほまみむめもや
りるれろわいうえをんあいうえおかきくけこさしすせそたちつてとなにぬねのはひふへほまみあいうえおかきくけこさしすせそたちつてとなにぬねのはひふへほまめもやいゆえよらりるれろわいうえをんあいうえおかきくけこさしすせそたちつてとなにぬねのはひふへほまみむめもやいゆえよらりるれろわいうえをんあいうえお

AB CDEFGHIJK LMNOPQ RS

AB CDEFGHIJK LMNOPQ RS あいうえおかきくけこさしすせそた

AB

FIG. 34A
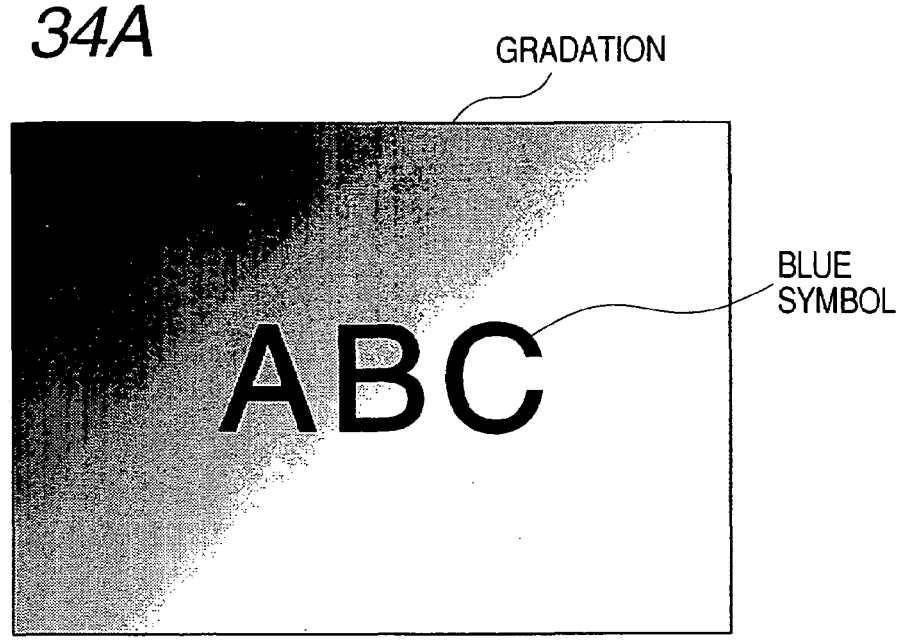
GRADATION
BLUE SYMBOL
FIG. 34B
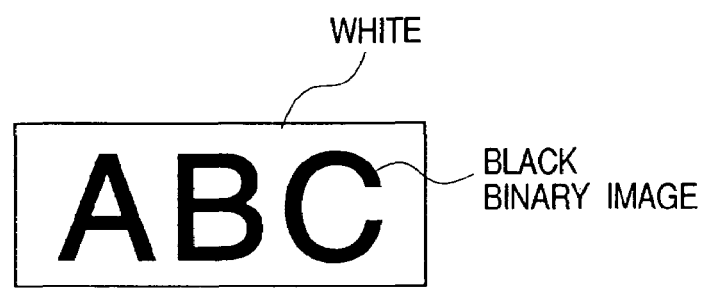
WHITE
BLACK BINARY IMAGE
FIG. 34C
| 00 | 01 | 02 | 03 | 04 |
|----|----|----|----|----|
| 10 | 11 | 12 | 13 | 14 |
| 20 |    | A  | B  | C  | 24 |
|    | 21 | 22 | 23 |    |
| 30 | 31 | 32 | 33 | 34 |

REPRESENTATIVE COLOR DATA
R=20, G=30, B=225

BLUE OF (20, 30, 225)

FIG. 41A

| -1 | -1 | -1 | -1 | -1 |
|----|----|----|----|----|
| -1 | -1 | -1 | -1 | -1 |
|    |    | *  |    |    |
| +1 | +1 | +1 | +1 | +1 |
| +1 | +1 | +1 | +1 | +1 |

| -1 | -1 |   | +1 | +1 |
|----|----|---|----|----|
| -1 | -1 |   | +1 | +1 |
| -1 | -1 | * | +1 | +1 |
| -1 | -1 |   | +1 | +1 |
| -1 | -1 |   | +1 | +1 |

FIG. 41B

| -1 | -1 | -1 |
|----|----|----|
| -1 | 8  | -1 |
| -1 | -1 | -1 |

6203
6202
6201
ENLARGEMENT

明日は晴れです。
昨日は雨でした。

明日は晴れです。
昨日は雨でした。

PROCESSING FOR ACCURATE REPRODUCTION OF SYMBOLS AND OTHER HIGH-FREQUENCY AREAS IN A COLOR IMAGE

RELATED APPLICATION

This application is a divisional application of application Ser. No. 09/902,172, filed Jul. 11, 2001 now U.S. Pat. No. 6,999,619.

BACKGROUND OF THE INVENTION

1. Field of the Invention

The present invention relates to an image processing-apparatus, an image processing method, and a program and a storage medium therefor.

2. Related Background Art

Recently, as a result of the current widespread employment of scanners, the digitization of documents has become a popular practice. However, for the storage, in bit map form, of a full-color, A4-sized digital document that has been scanned at 300 dpi, for example, a huge amount of memory, upwards of 24 Mbytes, must be allocated. And such a large data recording is not amenable to being attached to and transmitted with mail.

Therefore, JPEG, a well known compression technique, is commonly used to compress full-color image data. With JPEG, however, although it is very effective when used to compress natural images, such as photographs, and the quality of the images produced when it is used is high, when high-frequency portions, such as symbols, are compressed using JPEG, image deterioration called mosquito noise occurs, and the compression rate is also reduced. Therefore, since generally an office document includes many symbol portions, after a document is binarized, MMR is used to compress the binary document and obtain the coordinates of symbol portions and the representative colors of the symbols therein, so that an office document prepared in color can be easily represented. Further, for a complicated color document, such as a magazine, an area to be compressed is divided into background and symbol portions, and while the background is compressed using JPEG, symbols are binarized using an optimal threshold value and the obtained binary images are compressed using MMR, following which color information is added to the obtained MMR data. In this manner, even a fairly complicated color document can be represented using a small data file.

Therefore, a technique is required for calculating the representative color of symbols in a symbol portion. The following is an example conventional method used for calculating the representative symbol color.

First, a rough, three-dimensional histogram is prepared for multi-valued image data in a black portion by referring to the binary image of a symbol area. Then, a fine histogram is prepared for the pixels of a multi-valued image that corresponds to the highest value in the rough three-dimensional histogram, and the highest value that is thereby obtained is determined to be the representative color.

However, when the above method is employed to calculate the representative color of symbol colors, although a desirable color can be calculated for a symbol having a height of 12 points or more when read at a resolution of 300 dpi or higher, for a 10 point or smaller symbol, the ratio of the originally calculated representative color data to the black of the binary image is small, and a desired color can not be calculated.

An explanation will now be given, while referring to FIG. 19, for a case wherein calculations are performed to obtain the representative color of a large symbol, and for a case wherein calculation are performed to obtain the representative color of a small symbol.

FIG. 19 is a diagram showing a sample wherein green symbols are written on a white background. A binary result 1901 is obtained for a comparatively thick symbol, and the multi-valued image of a black portion in the binary result 1901 has a level change 1902. In the level change 1902, since the level remains steady for a long time at portions 1903 and 1904, which correspond to the representative color of the symbol, the color is distributed in the color space RGB as is shown in FIG. 20A. A block 2002 in FIG. 20A is the color green in FIG. 19, i.e., indicates the representative color of the symbol. Since the block 2002, of the symbol portion, has a specific size, it can be extracted comparatively easily.

But then, for a fine symbol 1906 in FIG. 19, the level change in a multi-valued image has a shape 1907, and as soon as the level reaches portions 1908 and 1909, which correspond to the representative color of the symbol, it is changed to the level of the background portion. In this case, the color distribution in the RGB color space is as is shown in FIG. 20B, and compared with the block 2002 in FIG. 20A, using the obtained data it is difficult to calculate a point 2005 in FIG. 20B. Through the binarization process, the left side of a broken line is binarized as a black symbol, and when the representative color is calculated using the conventional method, the point 2005 is obtained as a value, the greatest number that is present. This is not preferable because compared with the desired symbol color, the obtained symbol has a whitish-green cast.

In order to avoid the occurrence of this phenomenon, a method is available whereby a binary image is thinned and a conventional representative calculation is performed using a fine image. When this method is applied, however, a defect described in the following explanation occurs.

To simplify the explanation, a symbol "o" is used as an example.

Assume that in FIG. 21 a green symbol "o" is drawn on a white background. The level shift for the symbol "o" has a change 2104. Originally it would be ideal for the center indentation to be returned to the white level; however, the complete return to the white level of the symbol "o", a small point, may not be possible. If the binarization process is performed by using a threshold value 2105, a solid black dot 2102 is obtained as the binary result. And if the thinning process is then performed for this dot 2102, a black dot 2103 is obtained. In accordance with the level 2104, the position of the multi-valued image indicated by this binary image is a point 2106, which is not a preferable level for the representative color.

Since this "crushed phenomenon occurs for a symbol having a small point, it is apparent that the thinning process is not effective.

The binary image that is the output employed for representing a symbol is used to calculate the representative color for the symbol. However, it is preferable that a threshold value for optimally representing a symbol be binarized, so that no blurring of the symbol occurs. It is further known that, while taking the succeeding OCR process into account, it is better for a binarized symbol to become solid than it is for it to become blurred, since better OCR results can be obtained.

FIG. 22 is a graph showing a typical histogram for the brightness of a symbol area. A point 2201 is a desirable point for a binary image. However, when binarization is performed at this point 2201, a pixel that is shifted from the background to the symbol portion is binarized as a black dot, a preferable output, while when the calculation of the representative color of the symbol is performed, this output constitutes noise.

This state is shown in FIG. 22. When binarization is performed at the point 2201 in FIG. 22, this is the equivalent of binarization being performed at a level 2301 in FIG. 23, and the binary image that is obtained also includes many portions 2302 and 2303 that are shifted from the background to the symbol.

As is described above, since the binary image that is the output employed to represent a symbol is used for the calculation of the representative color of the symbol, it is not possible to calculate an optimal representative color for the symbol portion.

Furthermore, according to the conventional method, for each symbol area only one representative color can be obtained, and a symbol area in which multiple colors appear can not be coped with.

SUMMARY OF THE INVENTION

To resolve the above problems, it is one objective of the present invention to provide an image processing apparatus and an image processing method for calculating the optimal representative color for a symbol portion, and to provide a storage medium therefor.

To achieve this objective, according to the present invention, an image processing apparatus comprises:

histogram calculation means for calculating a histogram that is consonant with an input image;

binary threshold value calculation means for calculating a binary threshold value, based on the histogram, with which a predetermined area in the input image is blurred;

binarization means for binarizing the input image using the binary threshold value; and calculation means for calculating the color of the predetermined area of the input image based on the results obtained by the binarization means.

Further, to resolve the above described problems, it is another objective of the present invention to provide an image processing apparatus and an image processing method for allocating multiple colors to a symbol area, and a storage medium therefor.

To achieve this objective, according to the present invention, an image processing apparatus comprises:

binarization means for binarizing color image data;

detection means for detecting a symbol area in the color image data;

color reduction means for introducing, from N colors that constitute a symbol in the symbol area, M colors that are equal to or smaller than the N colors;

symbol cutting means for performing a symbol cutting process for the symbol area; and color allocation means for allocating one of the M colors for each cut symbol unit obtained by the symbol cutting means.

BRIEF DESCRIPTION OF THE DRAWINGS

FIG. 5 is a diagram showing a binary image obtained by binarizing the original image;

FIG. 7 is a diagram showing black areas that are extracted from the original image in accordance with a symbol attribute;

FIG. 19 is a diagram used for explaining a case wherein the representative color for a large symbol is calculated and a case wherein the representative color for a small symbol is calculated;

FIG. 28 is a diagram for explaining the symbol area detection processing performed according to the fourth embodiment of the present invention;

FIG. 31 is a diagram for explaining the symbol area detection processing performed according to the fourth embodiment of the present invention;

FIGS. 34A, 34B and 34C are diagrams for explaining the symbol painting processing performed according to the fourth embodiment of the present invention;

FIGS. 41A and 41B are diagrams for explaining the image compression processing performed according to the modification;

DETAILED DESCRIPTION OF THE PREFERRED EMBODIMENTS

Figure 1:
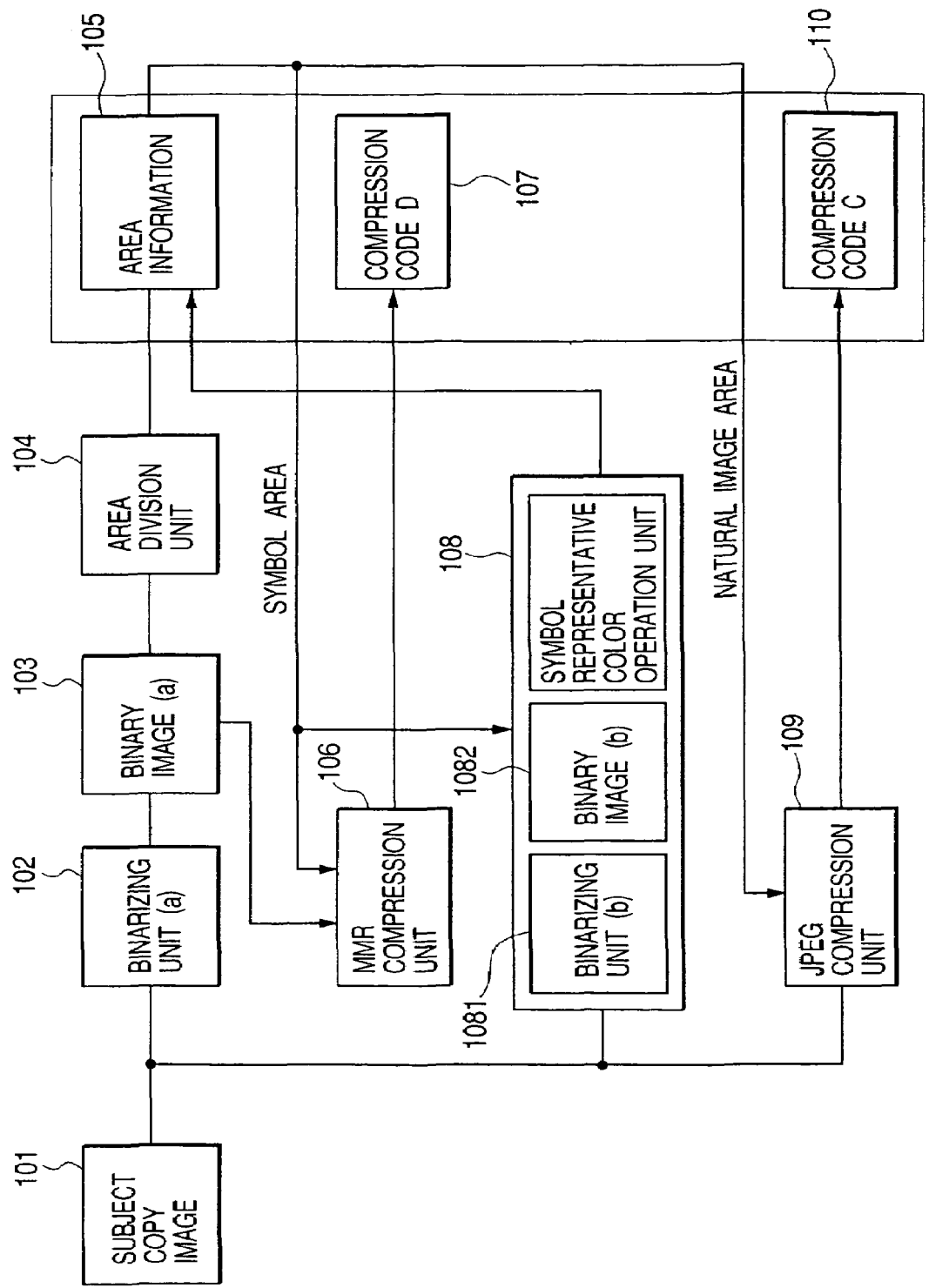
FIG. 1 is a diagram showing the configuration of an image processing apparatus according to a first embodiment of the present invention.

In the following embodiments, symbol contains character, and so on.

(First Embodiment)

The preferred embodiments of the present invention will now be described in detail while referring to the drawings.

FIG. 1 is a diagram showing the configuration of an image processing apparatus according to this embodiment.

A binarizing unit (a) 102 binarizes an input original image 101, and generates a binary image (a) 103.

An area division unit 104 detects a symbol area or a photograph area in the received binary image (a) 103, and generates the coordinates of the area and an attribute, such as area information 105, for example, for a symbol or a photograph.

Based on the area information 105, an MMR compression unit 106 performs MMR compression for a part of the binary image (a) 103 that corresponds to the area having a symbol attribute, and generates compressed code D 107.

Based on the area information 105, a symbol representative color operation unit 108 calculates the representative color of a symbol that is included in the area that corresponds to the area having the symbol attribute. A binarizing unit (b) 1081, for calculating the symbol representative color, is included in the symbol representative color operation unit 108 and generates a binary image (b) 1082. The color information obtained during this process is newly written as the attribute of the area information 105.

Based on the area information 105, a JPEG compression unit 109 compresses a part of the original image, which is included in the area corresponding to the area including the attribute of a natural image, and generates compressed code C 110.

This configuration will now be described in more detail.

Figure 3:
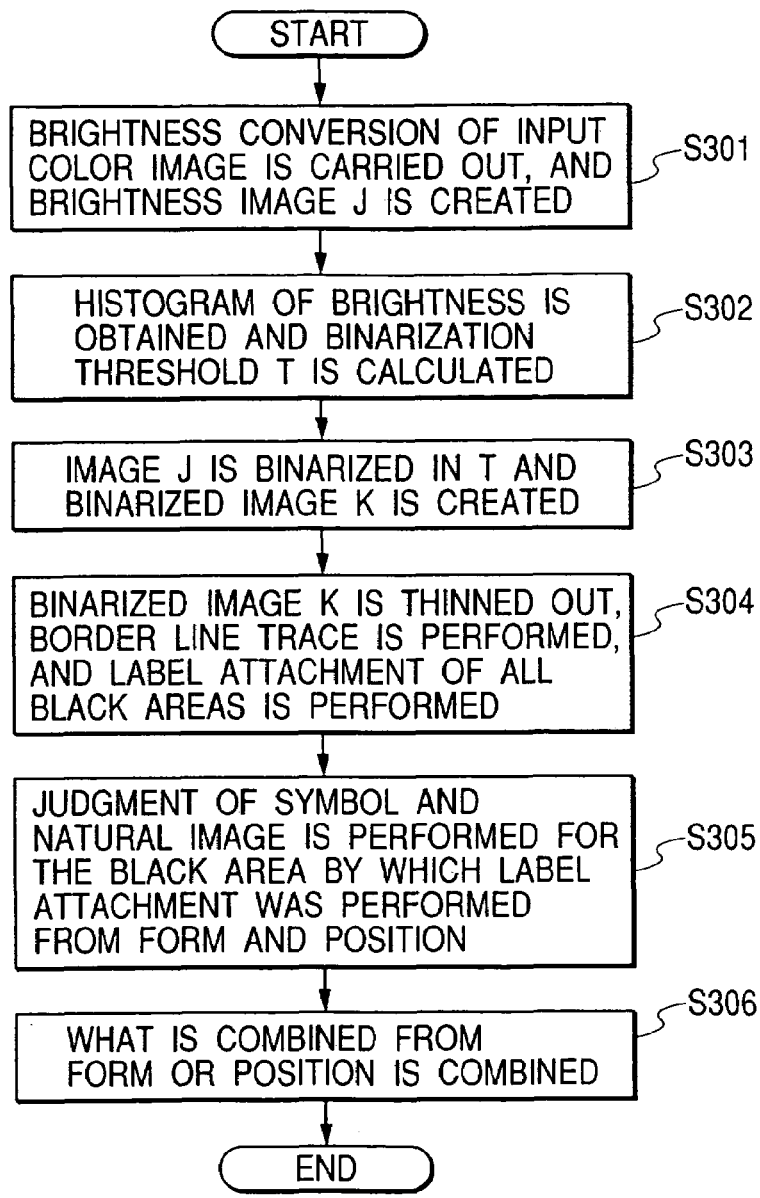
FIG. 3 is a flowchart showing the processing performed by a binarizing unit and an area division unit.

FIG. 3 is a flowchart showing the processing performed by the binarizing unit (a) 102 and the area division unit 104.

Steps S301 to S303 show the processing performed by the binarizing unit (a) 102, and steps S304 to S306 show the processing performed by the area division unit 104.

At step S301, an original image 101, such as an RGB color image, is input, and the brightness conversion for this image is performed by using the following equation to generate a brightness image J.

$$Y=0.299R+0.587G+0.114B.$$

At step S302 the brightness data histogram is prepared, and the threshold value T used for binarization is calculated.

At step S303, the brightness image J is binarized by using the threshold value T, and a binary image K is generated.

At step S304, the borderline of a black pixel is traced, and a label attachment is performed for each of the black areas.

At step S305, the forms and positions of the black areas to which the labels are attached are employed to determine whether the image is a symbol or a natural image.

At step S306, the symbol areas are combined in accordance with their forms and positions, although the combining process at step S306 need not always be performed. In this case, the number of symbol areas for which the representative color is calculated is increased and the processing time is extended, while the advantage is that a change in a color can be coped with accurately.

An explanation will now be given for a case wherein the processing is completed up to the combining process at step S306 by using the original image in FIG. 2.

Figure 2:
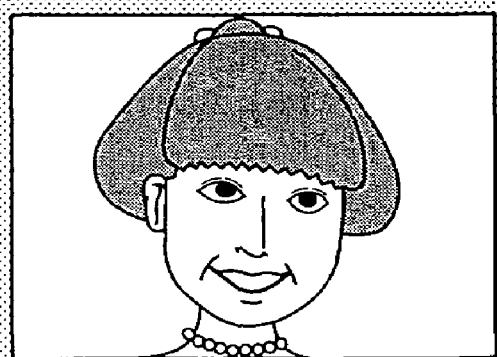
FIG. 2 is a diagram showing an example original image.
Figure 4:
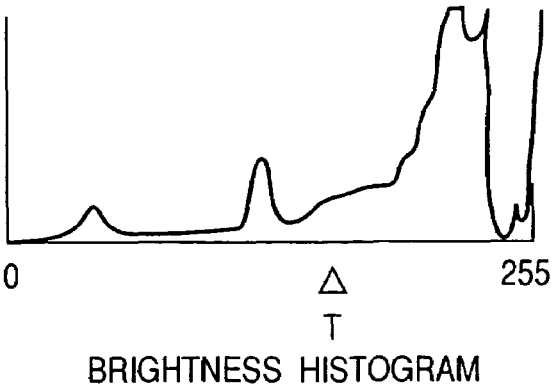
FIG. 4 is a graph showing a brightness histogram for the original image.
Figure 6:
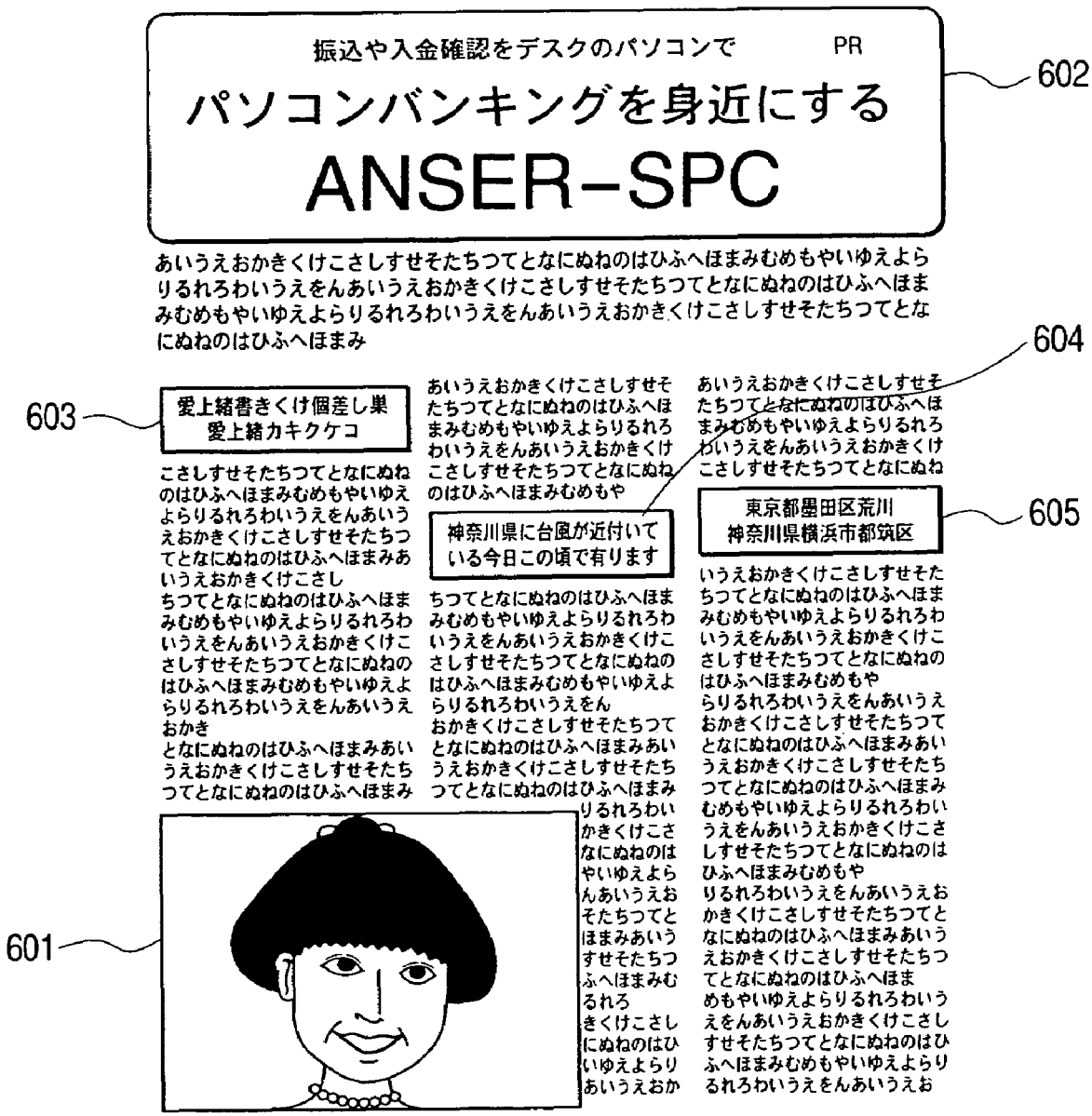
FIG. 6 is a diagram showing the state wherein label attachment is performed for the binary image.

The brightness conversion is performed for the original image in FIG. 2 (steps S301 and S302), and the obtained brightness histogram is as shown in FIG. 4. From this histogram, average and dispersion data are employed to calculate a threshold value T=150, and the obtained binary image, the binary image 103 in FIG. 1, is as is shown in FIG. 5 (S303). FIG. 6 is a diagram showing the state wherein the border line tracing is performed for the binary image in FIG. 5 at a reduced resolution, and label attachment is performed for all the black areas (S304). The form and position information of the black areas to which the labels are attached is employed to determine the attribute of a symbol or a natural image (S305). It should be noted that this image is not actually generated but is merely a concept. In this example, since a portion 601 is large and contains a black area, it is determined to be a natural image. Further, since areas 602 to 605 include symbols and have empty shapes, their areas are determined to be frames. In this embodiment, frame information is not included as area information 105, and is ignored. However, an application may hold the frame information, or may employ the frame information as the background for the symbol area information. In this case, means for calculating the color of the background must be provided.

Figure 8:
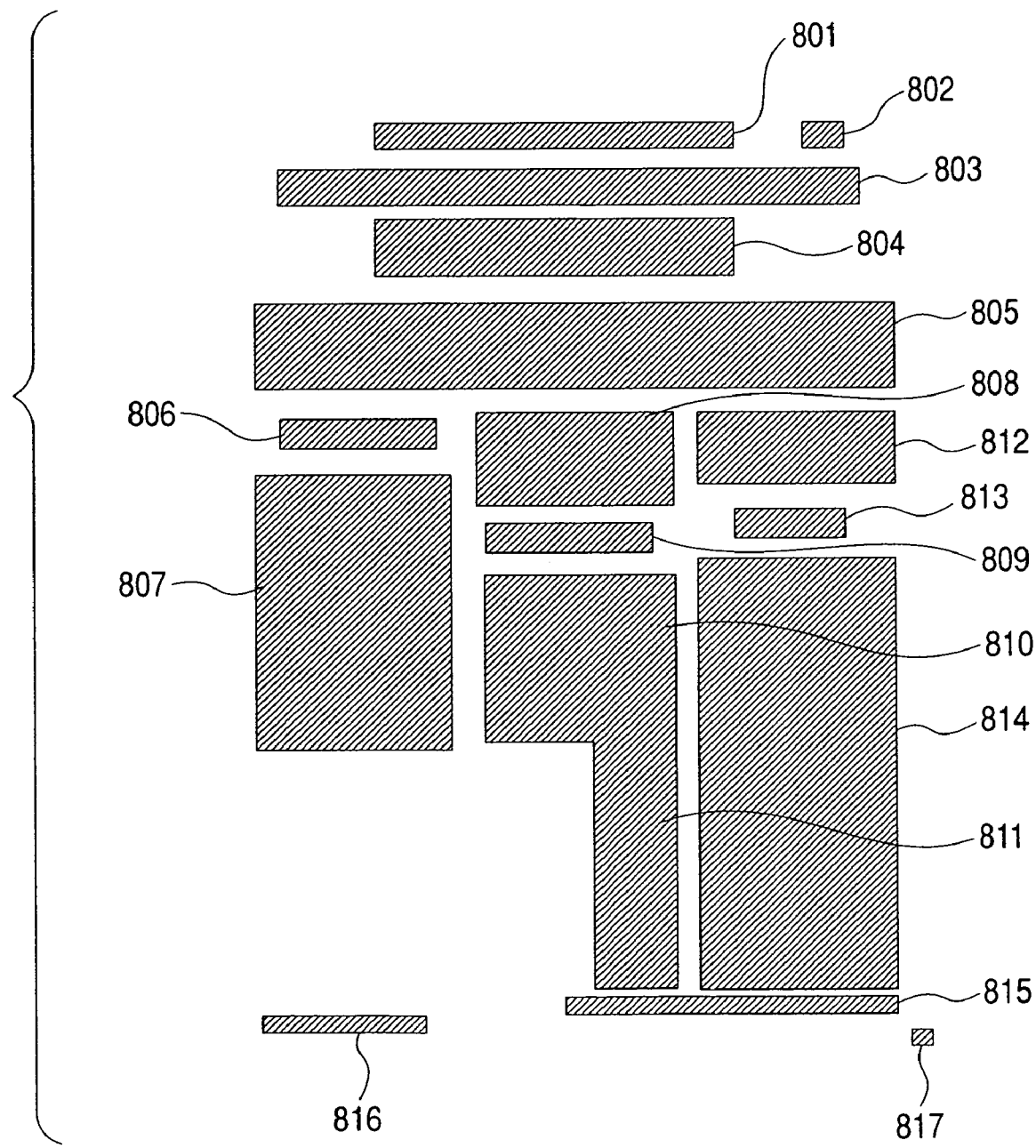
FIG. 8 is a diagram showing symbol areas in the original image.

FIG. 7 is a diagram showing a black area wherein the symbol attribute is extracted from the original image in FIG. 2. When black pixels are grouped in accordance with whether they are positioned near each other and whether their widths and heights match, 17 symbol areas, 801 to 817, shown in FIG. 8 can be detected, as needed. In this embodiment, grouping (S306) is performed, and the 17 coordinate data sets, for which the symbol attribute applies, are stored in the JPEG compression unit 109 in FIG. 1, while the coordinate data 601 in FIG. 6, for which a photograph attribute-applies, are stored in the JPEG compression unit 109 in FIG. 1.

Figure 9:
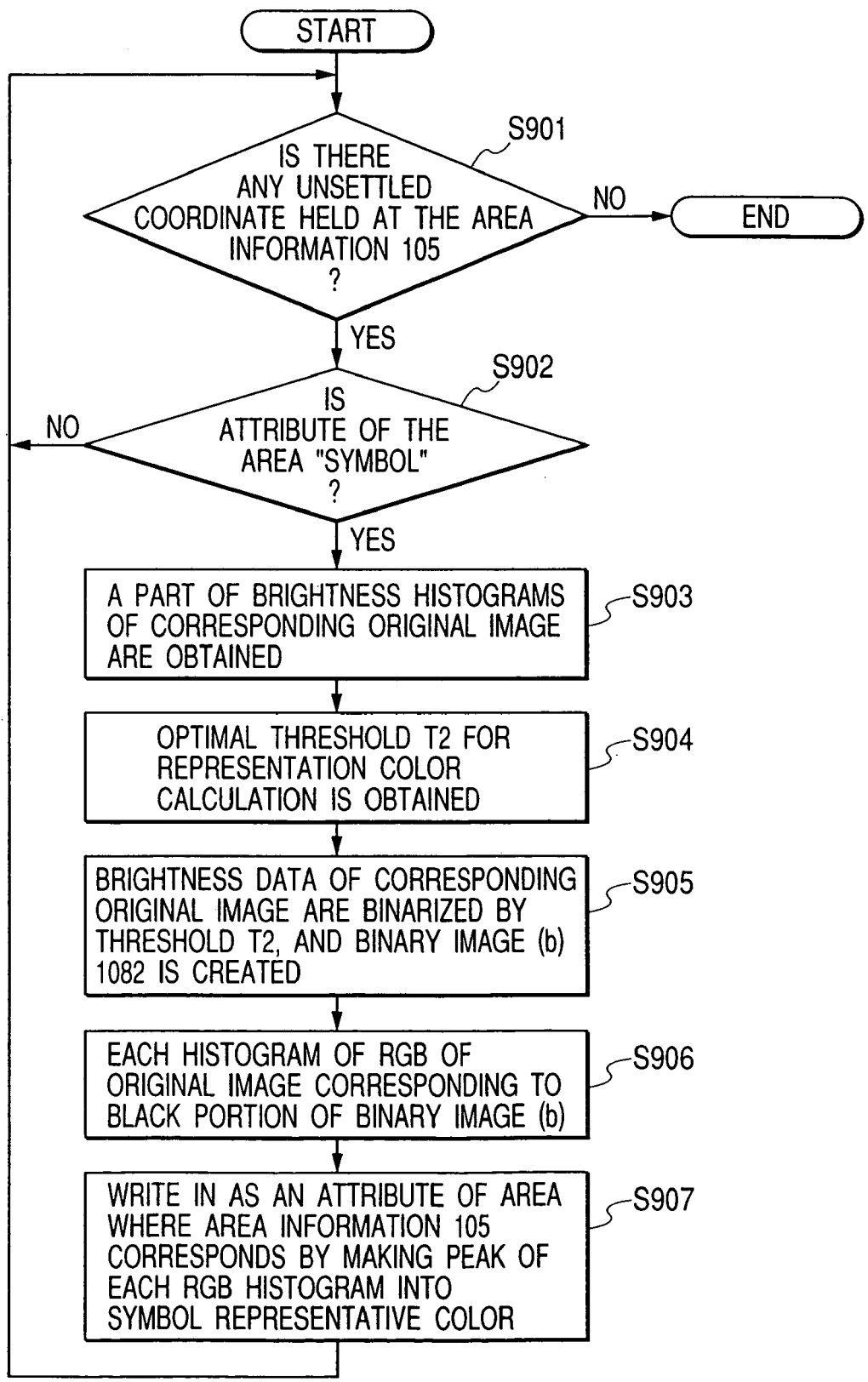
FIG. 9 is a flowchart showing the processing performed by a symbol, representative color operation unit.

FIG. 9 is a flowchart showing the processing performed by the symbol representative color operation unit 108. Since this processing is performed for all the coordinates included in the area information 105, at step S901 a check is performed to determine whether there is are symbol coordinates that have not been processed. If it is determined there are symbol coordinates that have not been processed, program control advances to step S902, or if it is determined there are no such coordinates, the processing is terminated.

At step S902, a check is performed to determine whether a symbol attribute applies to the coordinates; if one does, program control advances to step S903, whereas if one does not, program control returns to step S901.

At step S903, a brightness histogram is calculated for the original image corresponding to the area information. Since this histogram is for a partial symbol area, it is highly probable that it does not have a complicated shape comparable to that of the inclusive histogram shown in FIG. 4, but has a simple shape such as the one shown in FIG. 22.

At step S904, calculations are performed to obtain an optimal threshold value, i.e., a threshold value T2 according to which the blurring of a symbol occurs, to be used for determining a representative color. This threshold value T2 corresponds to the point 2202 in FIG. 22.

Figure 10:
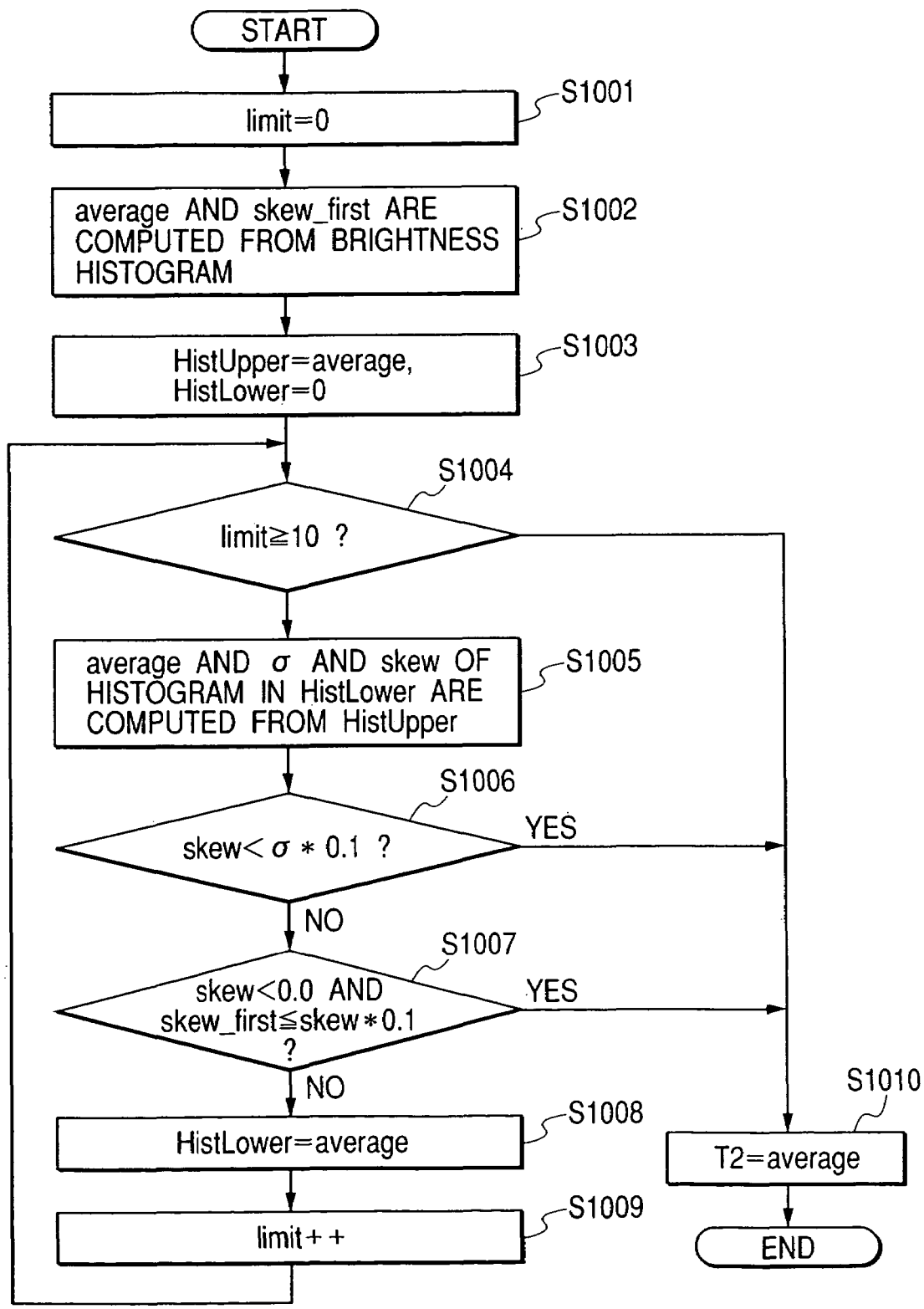
FIG. 10 is a flowchart showing an example method employed for calculating a threshold value T2.

An example method for calculating the threshold Value T2 will now be described using the flowchart in FIG. 10.

At step S1001, a value of 0 is substituted into a variable "limit" for counting the number of procedures, so that the processing does not enter an endless loop.

At step S1002, the brightness histogram is used for calculations performed to obtain an average value for the histogram and its skew, which is specially stored as skew_first. For these calculations, the following equations are employed.

$$average = \sum_{i=0}^{255} histgram(i)$$

$$skew\_first = \sum_{i=0}^{255} (i - average)^3 * histgram(i)$$

At step S1003, "average" is substituted into HistUpper, and a value of 0 is substituted into HistLower, following which, at step S1004, a check is performed to determine whether a variable "limit" is equal to or greater than 10. When the variable "limit" is equal to or greater than 10, program control is shifted to step S1009 (in this case, instead of 10, 5 or 20 may be employed). Then, at step S1005, HistUpper is used to calculate the histogram for HistLower.

$$average = \sum_{i=HistLower}^{HistUpper} histgram(i)$$

$$myu = \sum_{i=HistLower}^{HistUpper} (i - average) * histgram(i)$$

$$skew = \sum_{i=HistLower}^{HistUpper} (i - average) * histgram(i)$$

At step S1006, a check is performed to determine whether the condition skew<my*0.1 is satisfied, and when it is, no further calculations are required and program control jumps to step S1010. When this condition is not satisfied, however, program control advances to step S1007 whereat a check is performed to determine whether the conditions skew<0.0 and skew_first<skew*0.1 are satisfied. If these conditions are satisfied, no further calculations are required and program control jumps to step S1010. But if these conditions are not satisfied, program control advances to step S1008 and "average" is substituted into "HistLower". Subsequently, at step S1009, the variable "limit" is incremented by one and program control returns to step S1004.

Figure 22:
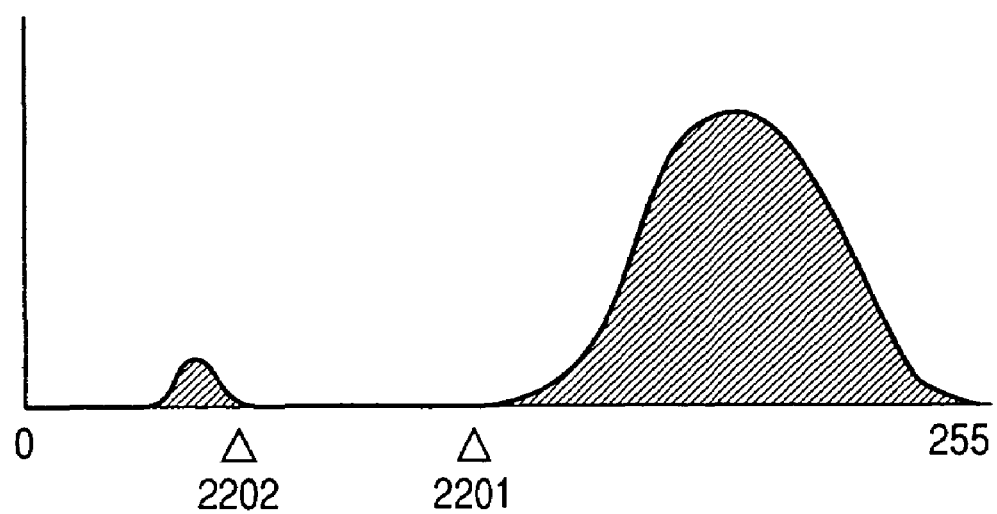
FIG. 22 is a graph showing a typical brightness for a symbol area.
Figure 23:
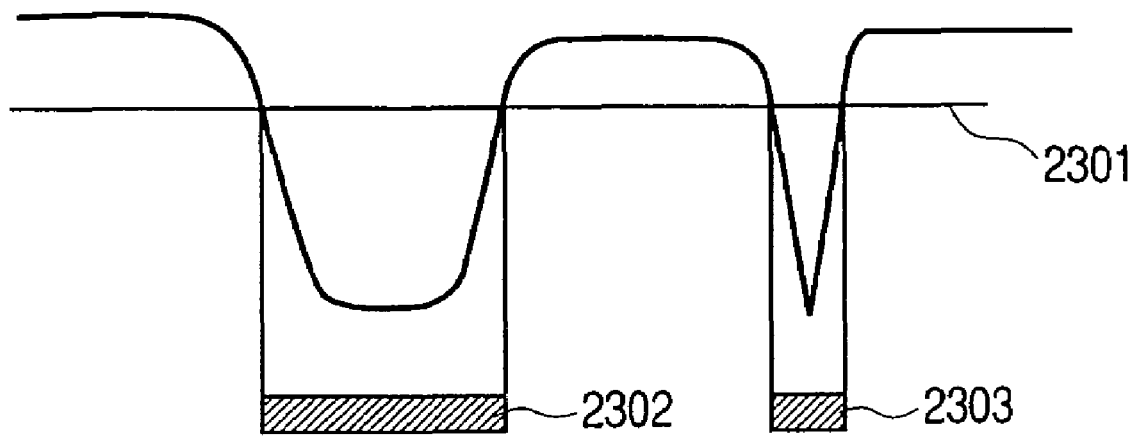
FIG. 23 is a diagram showing the results obtained by binarizing an image.

By repeating this procedure, "average" is finally substituted into the threshold value T2 at step S1010, and as a result, a threshold value is acquired that yields the blurred binary image indicated by the point 2202 in FIG. 22.

Figure 17:
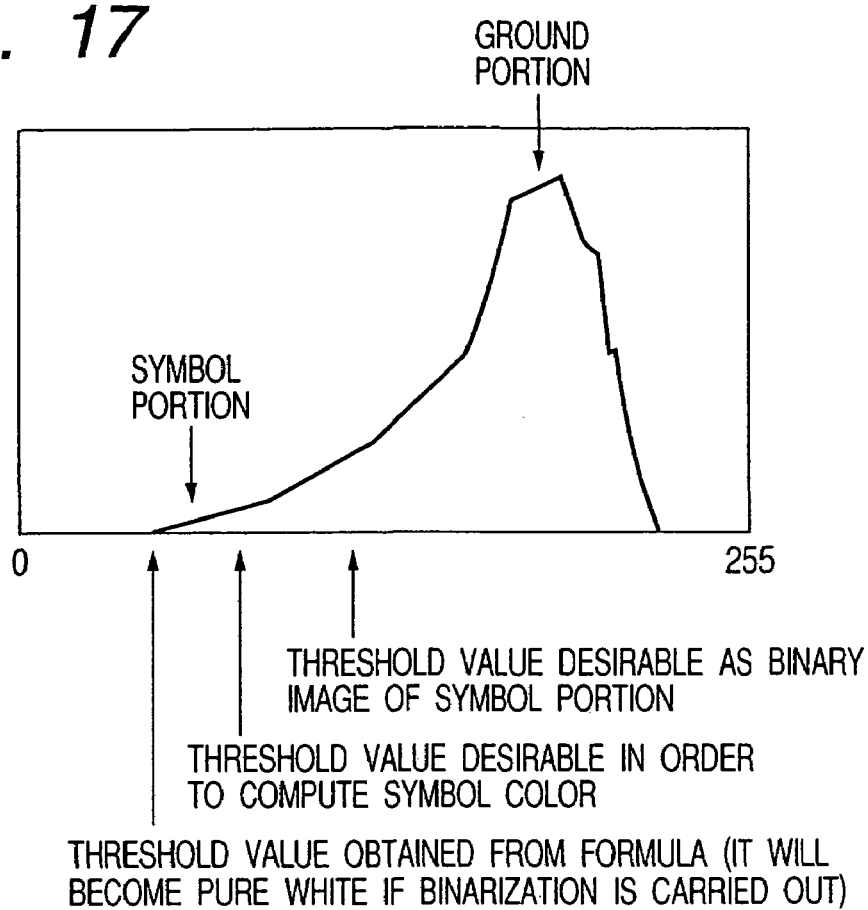
FIG. 17 is a diagram showing an example histogram shape.

Since the threshold value, according to which no black pixels are present when the image is binarized, could be obtained depending on the shape of a histogram, the number of pixels nearer the black area from the threshold value T2 is counted. When the number of pixels is extremely small, the pixels need to be more or less corrected so they are closer to being white. The shape of the histogram that tends to echo such results is shown in FIG. 17.

Figure 18:
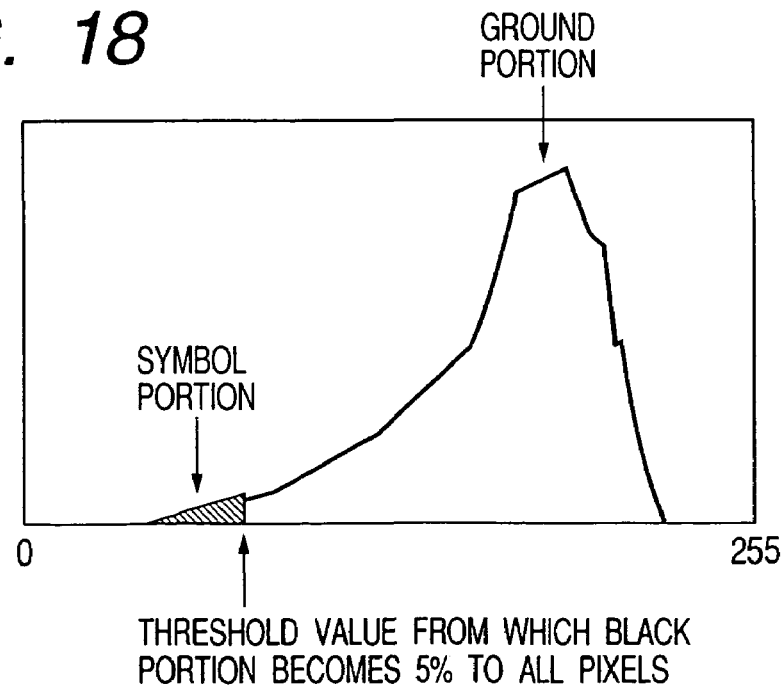
FIG. 18 is a diagram showing an example method used for calculating a threshold value T2.
Figure 20A:
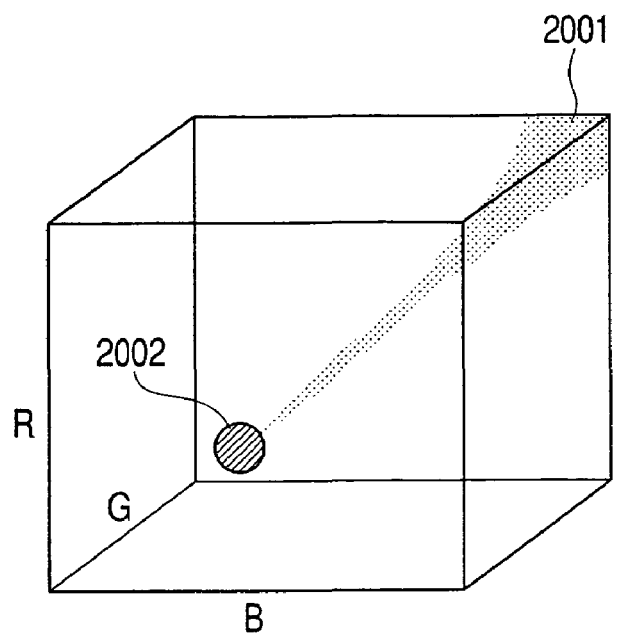
FIGS. 20A and 20B are diagrams showing distributions in the RGB space.
Figure 20B:
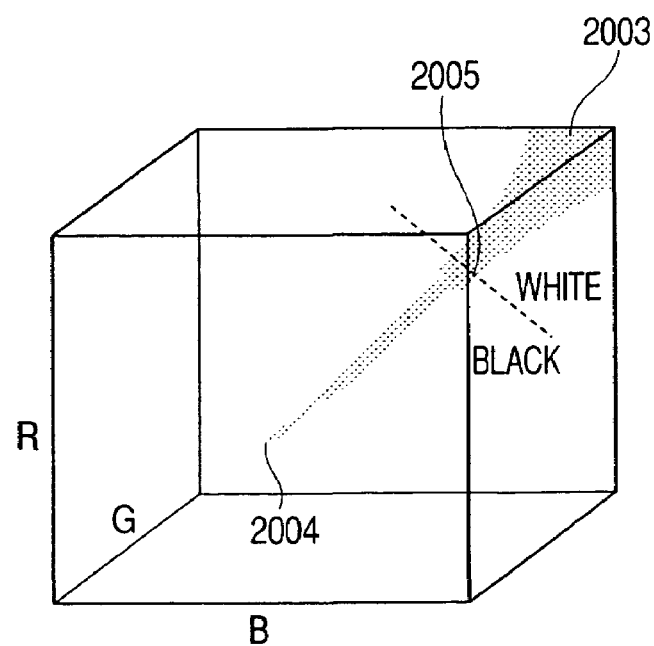

Instead of the complicated calculations described above, according to another method for obtaining a histogram and for selecting a threshold value, 5% of all pixels (this number is merely an example) are binarized into black dots. FIG. 18 is a diagram showing a threshold value calculation example.

Figure 21:
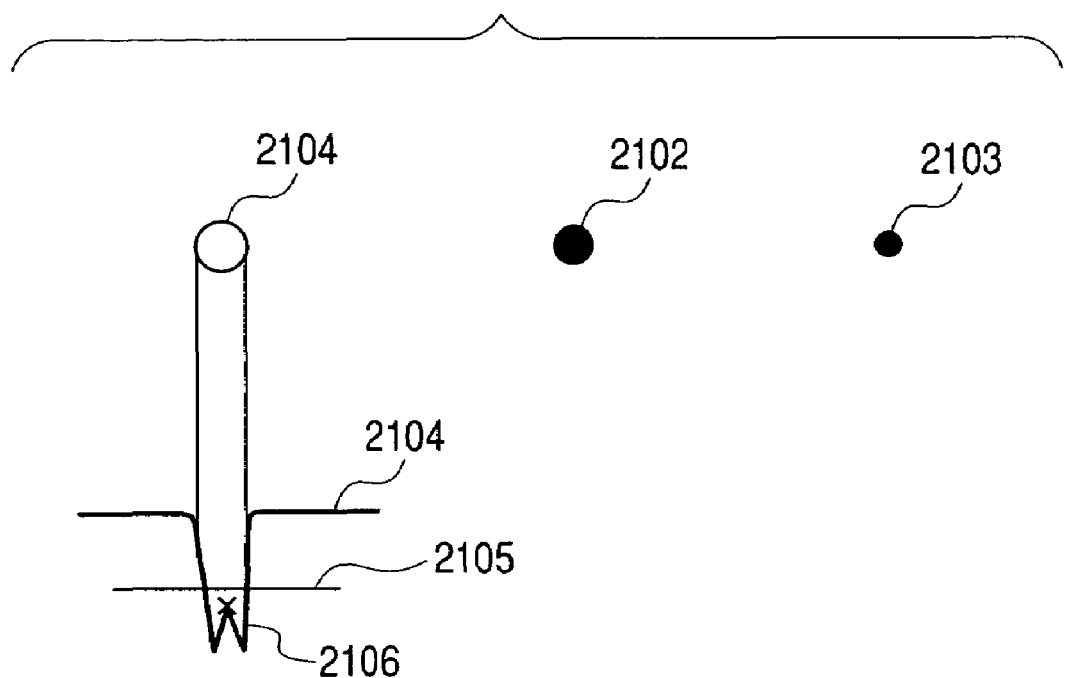
FIG. 21 is a diagram for explaining the thinning of a binary image.
Figure 24:
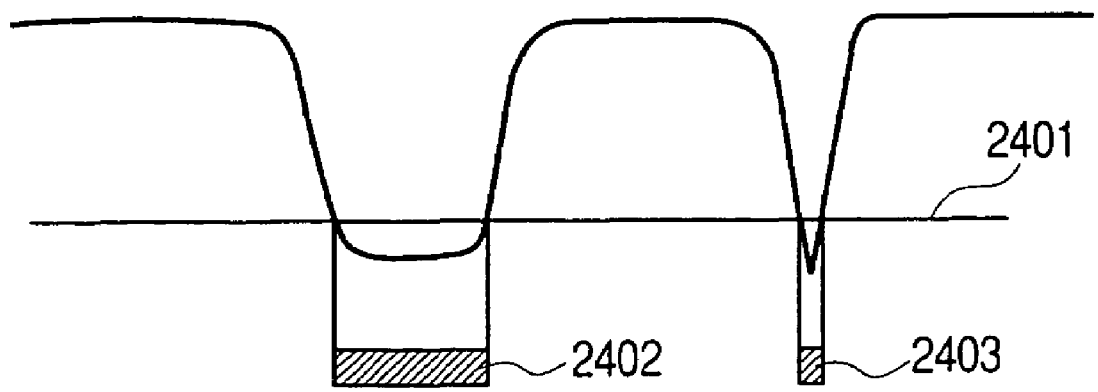
FIG. 24 is a diagram showing the results obtained by binarizing an image.

At step S905, the binarizing unit (b) 1081 binarizes a partial area using the threshold value T2, and generates the binary image (b) 1082 in FIG. 1. As is shown in FIG. 22, the area is binarized by using the threshold value T2, i.e., the point 2202, and this means that the area is binarized at the level 2401 in FIG. 24, so that the binarization can be performed without including the shifting portions 2402 and 2403. Then, as needed, the thinning process is performed for the obtained binary image. Since the threshold value is the one according to which blurring of the binary image occurs, the probability is reduced that a failure will occur during the thinning process conventionally performed for the representative color calculation, as explained while referring to FIG. 21. At step S906, a histogram is generated for each RGB pixel of the original image that corresponds to the black portions of the binary image (b). The color space for the histogram may not only be RGB, but may also be YUV when the original image is YUV. At step S907, each of the peaks of the RGB histograms are defined as symbol representative colors, and are written in the area information 105 as the attributes of corresponding areas.

The following other methods may be employed for steps S906 and S907. For example, instead of the histogram for each RGB pixel, a RGB three-dimensional histogram is calculated. In this case, it is impossible for the function of a calculator to calculate a histogram in detail, and it is preferable that a rough histogram be calculated in order that it will not be affected by the noise produced by a color shift point. As one method, first a highest value is obtained by using the rough histogram, then a detailed histogram present in the rough histogram is calculated, and finally the highest value is obtained again.

Finally, according to the binary image area information, MMR compression is performed for the area for which the symbol attribute applies and that corresponds to the binary image (a) 102, and the compressed code D 107 is generated. Also, JPEG compression is performed for the area for which the natural image attribute applies and that corresponds to the original image data, and compressed code C 110 is generated. As needed, a format is generated by collecting the area information 105 that includes the area type, such as a symbol or a natural image, and the representative color when the image is a symbol, as well as the compressed code C 111 and the compressed code D 112. The obtained format is used as compressed data.

(Second Embodiment)

Figure 11:
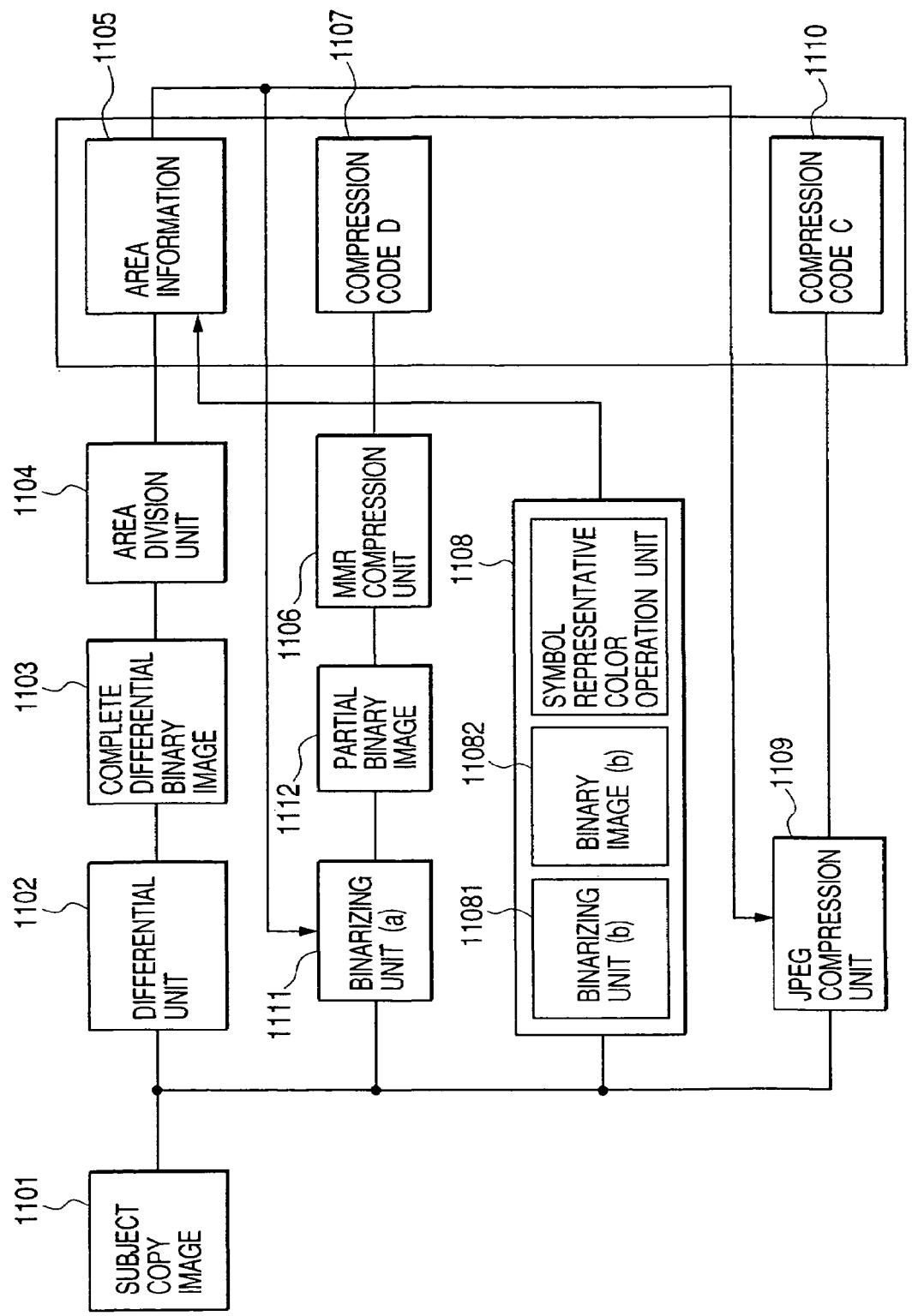
FIG. 11 is a diagram showing the configuration of an image processing apparatus according to a second embodiment of the present invention.

FIG. 11 is a diagram showing the configuration of an image processing apparatus according to a second embodiment of the present invention. In this embodiment, a binary image obtained by using a threshold value is not employed as an image for which area division is performed. Instead, an edge amount relative to an adjacent pixel is calculated for all the pixels through differential filtering, and is binarized to obtain a binary image, and this binary image is used to perform area division. Border line tracing as used in the first embodiment is also used as an area division method.

The difference between the first and this embodiment is that an area that is to be extracted as a symbol also includes an area that would be inverted by normal binarization.

Figure 12:
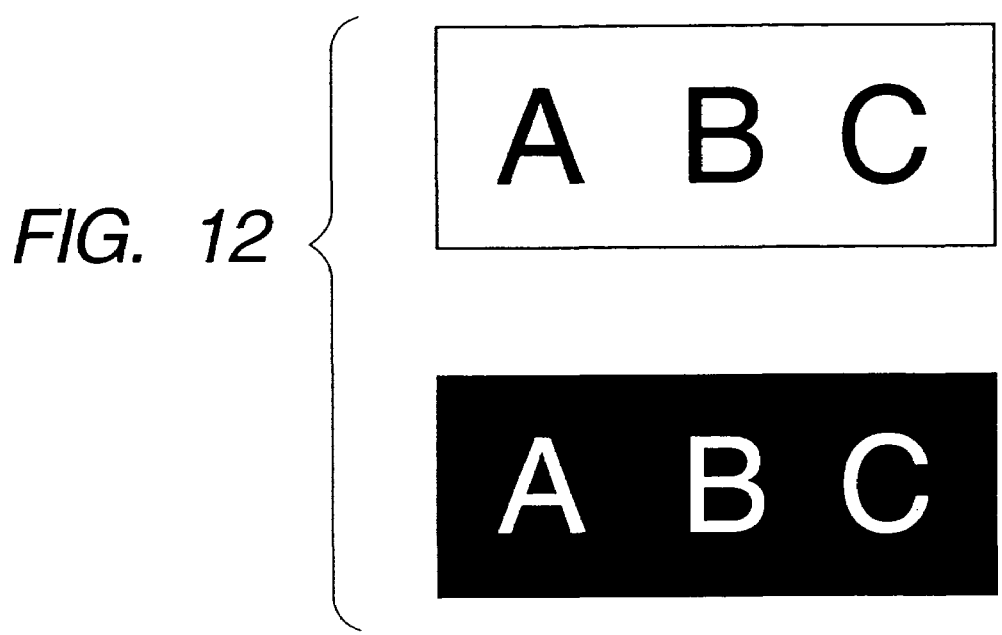
FIG. 12 is a diagram showing a difference between normal symbols and inverted symbols.

FIG. 12 is a diagram showing the difference between normal symbols and inverted symbols. An inverted symbol is, for example, a white symbol on a red background, not particularly a rarity in a color document. In the first embodiment, a symbol attribute is not provided for an inverted symbol, and a natural nature attribute is provided for an area that includes an outer colored frame. In this embodiment, since a differential binary image is used for area division, an inverted symbol area, as shown in FIG. 12, can also be divided into symbols. In this case, the brightness histogram has the shape shown in FIG. 13, while normally a symbol area histogram has the shape shown in FIG. 22. A crest portion 1301 indicates a block of the background, and a crest portion 1302 indicates a block of symbols. In this embodiment, the inversion process is required for a binarization process for generating a partial binary image (b) (11082 in FIG. 11) used to calculate the symbol representative color.

A determination as to whether a symbol is to be inverted can be made using the following equation.

The following equation is an example for the configuration in FIG. 1.

$$\text{average} = \sum_{i=0}^{255} \text{histgram}(i)$$

$$\text{skew\_first} = \sum_{i=0}^{255} (i - \text{average})^3 * \text{histgram}(i)$$

Figure 13:
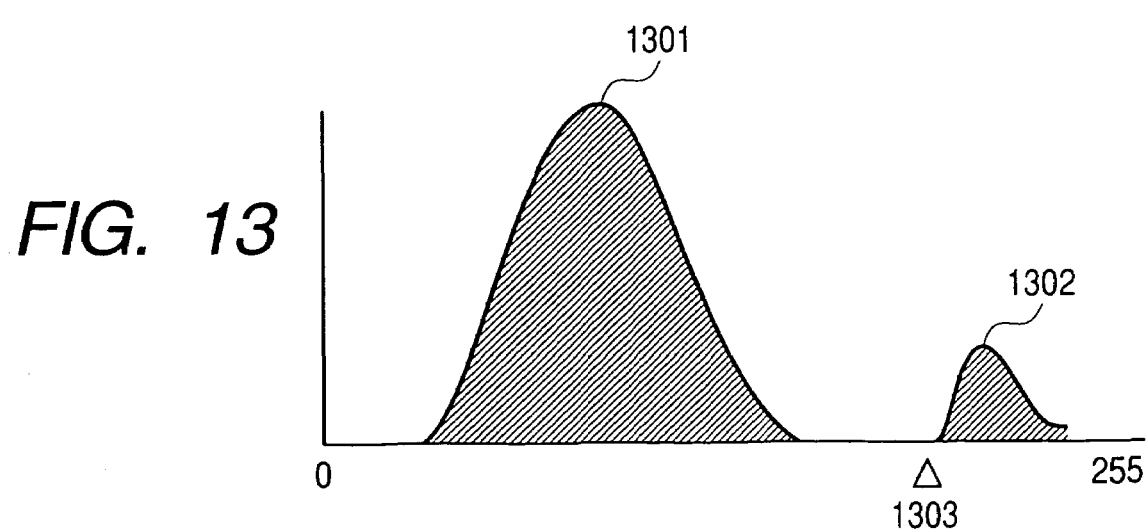
FIG. 13 is a graph showing a brightness histogram for the inverted symbol portion.

It can be ascertained that when skew_first is negative, the area is the normal symbol portion shown in FIG. 22, and that when skew_first is positive, the area is the inverted symbol portion shown in FIG. 13.

Figure 16:
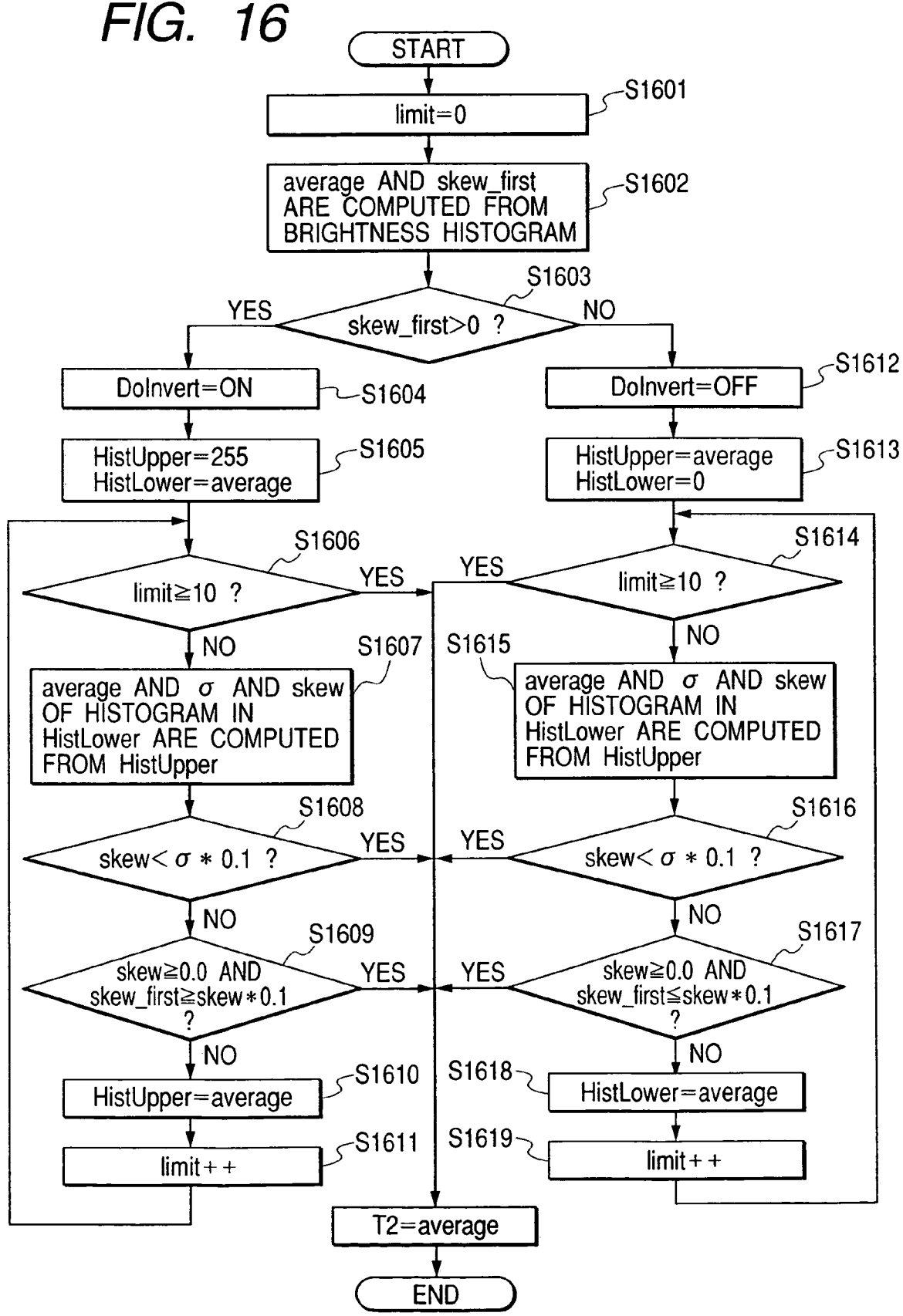
FIG. 16 is a flowchart showing the processing performed for the inverted symbol.

This processing will be briefly explained while referring to the flowchart in FIG. 16. In FIG. 16, the right side (S1613 to S1619) is exactly the same as the flowchart in FIG. 10, and the left side (S1605 to S1611) is the calculation process for the inverted symbol.

When skew_first is greater than 0 at step S1603, a DoInvert flag, which instructs the binarization unit to perform an inversion process, is set.

When the DoInvert flag is set (ON), a binarizing unit (b) 11081 and a binarizing unit (a) 1111, which outputs the visual results, invert the binarization results. In the arrangement provided to cope with an inverted symbol, an area division unit 1104 must detect an area having a frame attribute, and the average color in the frame must also be calculated. This is because the background color of the inverted symbol is other than white, and this color must be represented. The frame area average color operation unit in charge of this process is not shown in FIG. 11.

With the arrangement in FIG. 14, which will be described later, since all the JPEG data is held for the background, an area having a frame attribute need not be prepared to cope with an inverted symbol.

(Third Embodiment)

Figure 14:
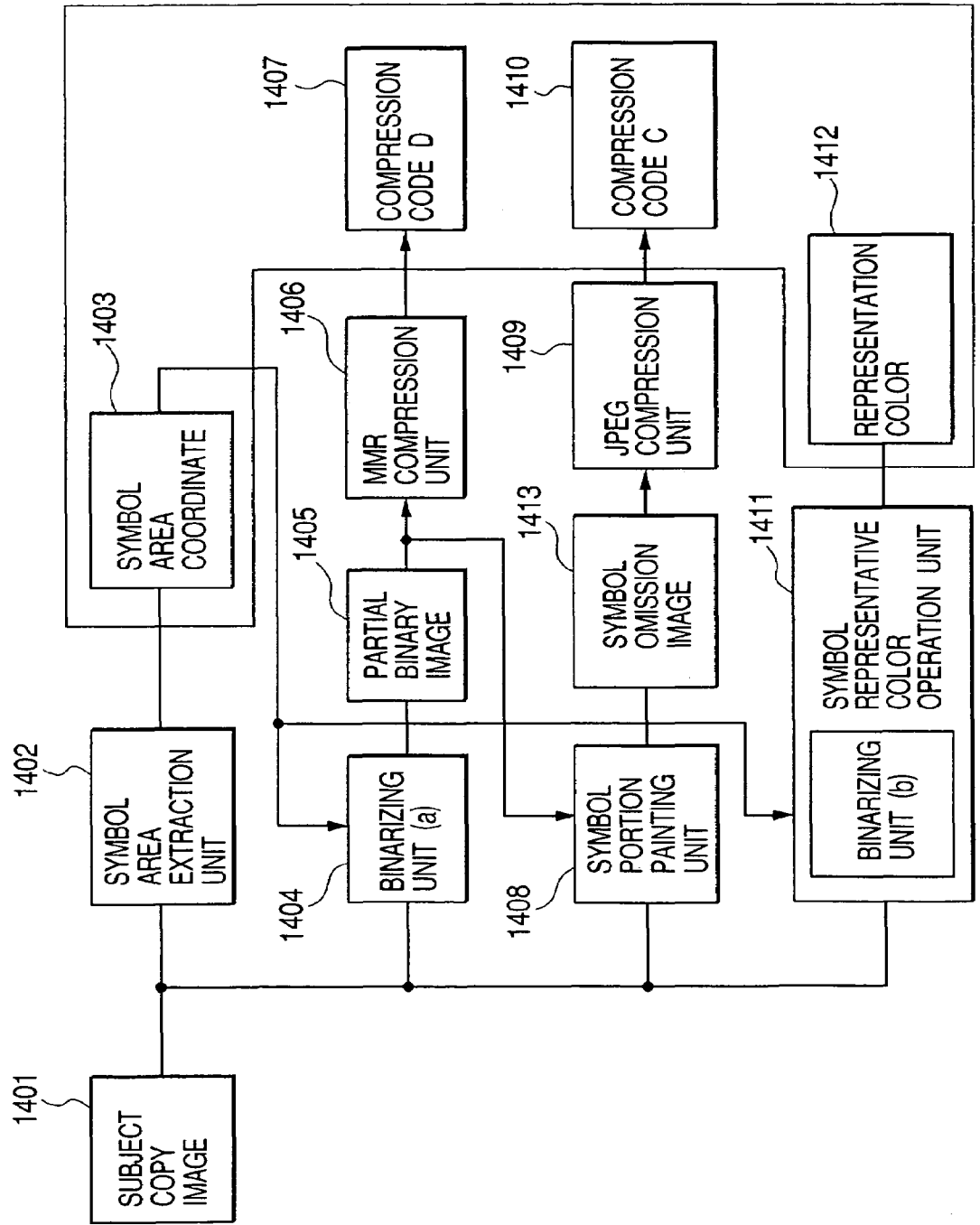
FIG. 14 is a diagram showing the configuration of an image processing apparatus according to a third embodiment of the present invention.

The configuration of an image processing apparatus shown in FIG. 14 may also be employed.

The configuration in FIG. 14 will be briefly described.

In this configuration, a symbol area extraction unit 1402 for detecting only the coordinates of a symbol area is provided for the area division process, and stores a symbol area coordinate 1403.

A binarizing unit 1404 generates a binary image 1405 of a symbol area, and in accordance with the binary image 1405, a symbol portion painting unit 1408 generates a document 1413 wherein the symbol portion of the original image is painted the average color of the surrounding portion. MMR compression is performed for the obtained partial binary image, and compressed code D is generated, while JPEG compression is performed for the symbol omission image and compressed code C is generated.

A symbol representative color operation unit 1411 performs the processing shown in FIG. 9 for the first embodiment, and generates a representative color 1412.

Figure 15:
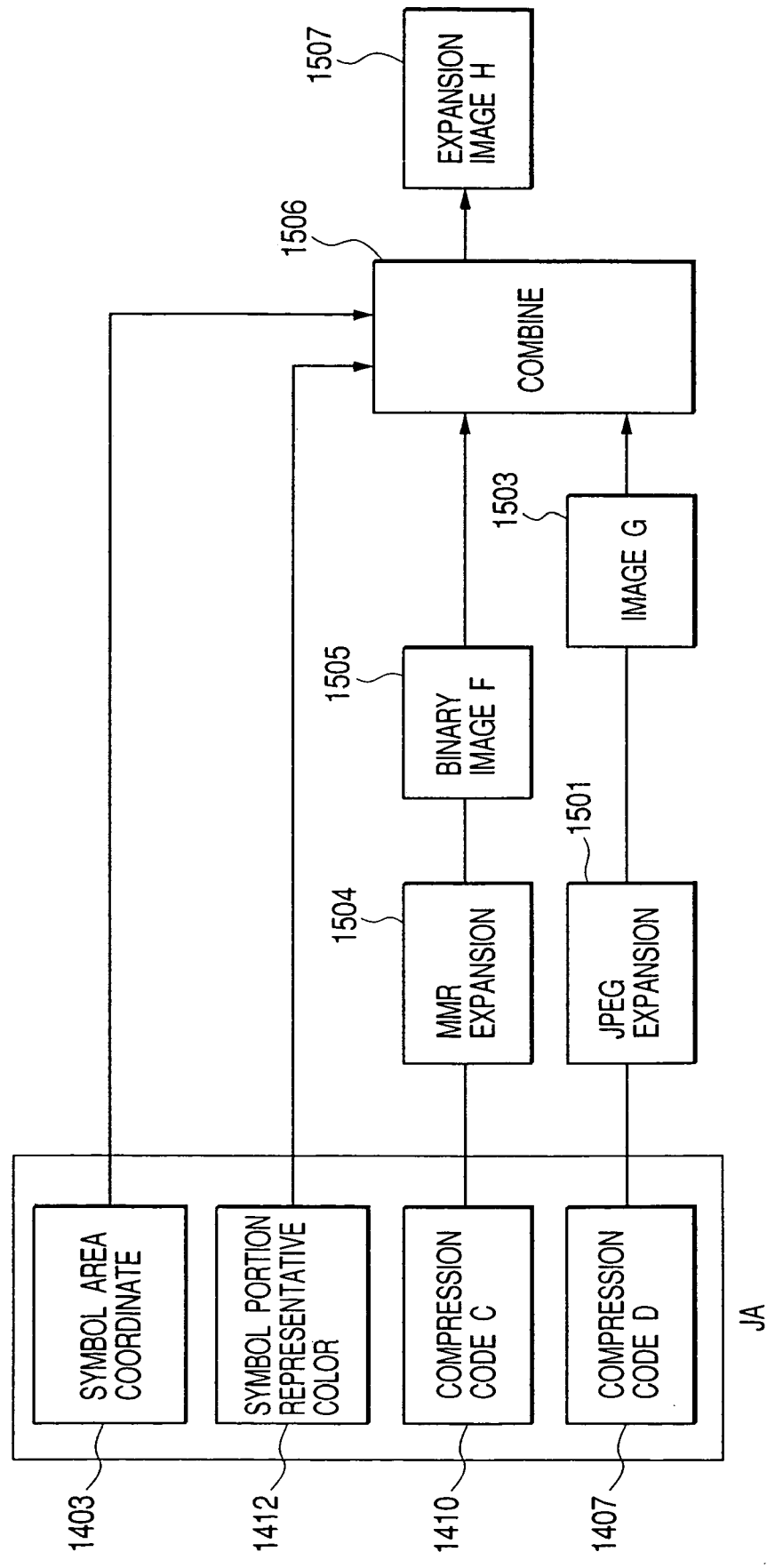
FIG. 15 is a diagram showing the configuration according to the third embodiment for expanding compressed data.

FIG. 15 is a diagram showing the configuration for expanding compressed data obtained by the arrangement in FIG. 14.

To expand the compressed data, a JPEG expansion process is performed for the compressed data C, and a multi-valued image G is generated. Further, the MMR expansion process is performed for the compressed code D, and a binary image F is generated for the partial area. Then, a combining process is performed in which the representative value is added to the black binary pixels in the image G while the binary white image is unchanged, and finally, an image H is obtained.

Compared with the configurations in FIGS. 14 and 15, the entire JPEG image from which the symbol area is omitted is maintained, so that the atmosphere of the original image is not lost.

(Modification)

The present invention may be employed for a system that is constituted by multiple apparatuses (e.g., a host computer, an interface device, a reader or a printer), or for a single apparatus (e.g., a copier or a facsimile machine).

Further, the objective of the invention can also be achieved by supplying, to a system or an apparatus (or a CPU or an MPU), a storage medium (or a recording medium) on which software program code that implements the functions of the embodiments is recorded, and by permitting the system or the apparatus to read and execute the recorded program code. In this case, the program code read from the storage medium provides the functions of the above described embodiments, and the storage medium on which the program code is recorded constitutes the present invention. In addition, with the present invention it is not only possible for the functions of the previous embodiments to be provided by the execution of program code by the computer, but also, the program code can interact with an Operating System (OS) running on a computer, or with another software application, to provide the functions described in the above embodiments.

Furthermore, with the present invention, program code, read from a storage medium, can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

As is described above, according to the present invention, a histogram consonant with an input image is calculated, and is employed to calculate the binary threshold value according to which a predetermined area in an image is blurred. The input image is binarized by using the obtained binary threshold value, and is employed to calculate the color of the predetermined area of the input image. Therefore, even for a thin line symbol, the color data of the portion that is shifted from the background to the symbol can be deleted, so that an optimal representative color can be obtained for the symbol.

(Fourth Embodiment)

An explanation will now be given for an image processing apparatus according to a fourth embodiment of the present invention that efficiently compresses image data, while maintaining the information conveyed by an original image, before storing a full color image on a storage medium or transmitting it via a transmission medium.

The image processing apparatus of this embodiment, first generates a brightness histogram for the entire image area, binarizes the image area, and extracts several symbol areas. Then, a symbol cutting process is performed for the individual symbol areas, and the results are employed to determine whether each obtained area should be treated again as a symbol area. When the area should not be treated as a symbol area, a check is performed to determine whether an object in the pertinent area has a single color. When the object has a single color, it is ascertained that MMR compression should be performed for this object. When the object does not have a single color, it is ascertained that JPEG compression should be preformed for the object. Further, when it is determined that the image should be treated as a symbol area, the colors constituting the area are reduced through a predetermined color reduction process. When only one color is obtained through the color reduction process, the palette (e.g., (R, G, B)=(20, 30, 40)) representing that color is determined to be an MMR compression target, while being correlated with the binary image. When through the color reduction process the image can be represented by a predetermined number (e.g., four) of colors or less, each time the symbol cutting process is performed, palettes representing the individual colors and multi-valued images indicating the pixel positions of the colors are correlated with each other to be determined as ZIP compression targets. When the image can not be represented by the predetermined number of colors, the original image before the color reduction process is performed is determined to be the JPEG compression target.

Figure 25:
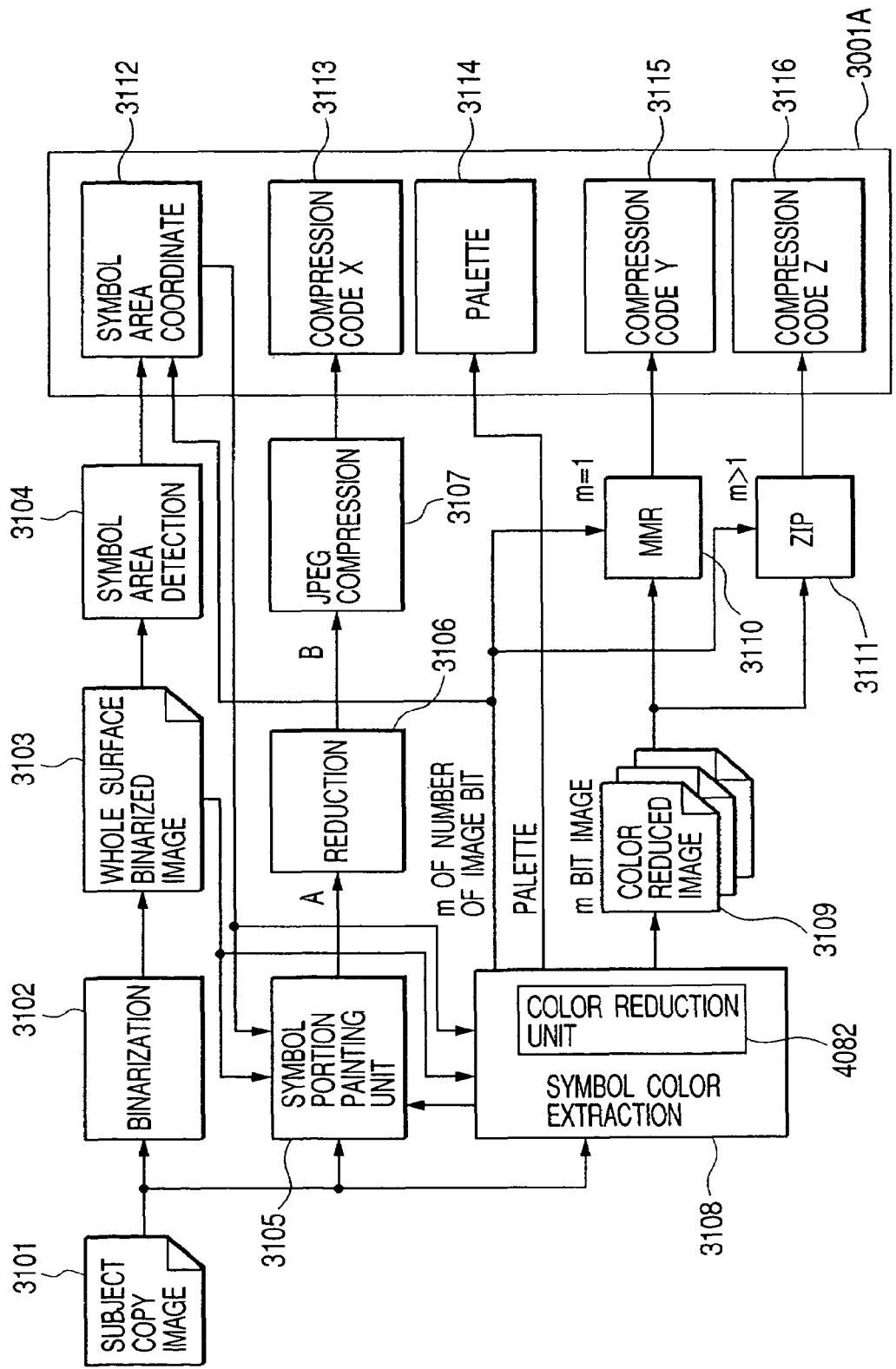
FIG. 25 is a diagram showing the configuration of an image processing apparatus according to a fourth embodiment of the present invention.

FIG. 25 is a diagram showing the configuration used when the present invention is employed for the image compression method. An image binarizing unit 3102 receives an original image 3101, and optimally binarizes the original image 3101 to obtain a whole surface binarized image 3103. A symbol area detector 3104 receives the complete surface binarized image 3103, detects a symbol area, and prepares symbol area coordinates 3112.

A symbol color extraction unit 3108 receives the symbol area coordinates 3112, refers to the original image at the coordinates and the binary image 3103 to calculate the original image color in the black portion of the binary image, prepares multiple palettes 3114, and performs the color reduction process for the original image in accordance with the palettes 3114.

A symbol portion painting unit 3105 extracts, from the original image, the black portion of the binary image 3103 in an area that is determined to be a symbol by the symbol area detector 3104 and for which the symbol color extraction unit 3108 reduces the number of symbol colors to less than M, paints the black portion the color of the surrounding portion, and prepares an image A.

A reduction unit 3106 receives and reduces the image A, and generates an image B.

A JPEG compression unit 3107 receives the image B and performs JPEG compression for the image B to generate compressed code X (3113).

A color reduced image 3109 is for multiple symbol areas the colors of which are reduced by the symbol color extraction unit 3108. When the color reduced image 3109 is one bit, an MMR compression unit 3110 receives the color reduced image 3109 and performs MMR compression to obtain multiple compressed codes Y (3115). For a reduced color image 3109 of two bits, a ZIP compression unit 3111 receives this image 3109 and compresses it to obtain multiple compressed codes Z (3116). Finally, the data 3112 to 3116 are combined to obtain compressed data 3001A.

Symbol Area Detection Process

Figure 27:
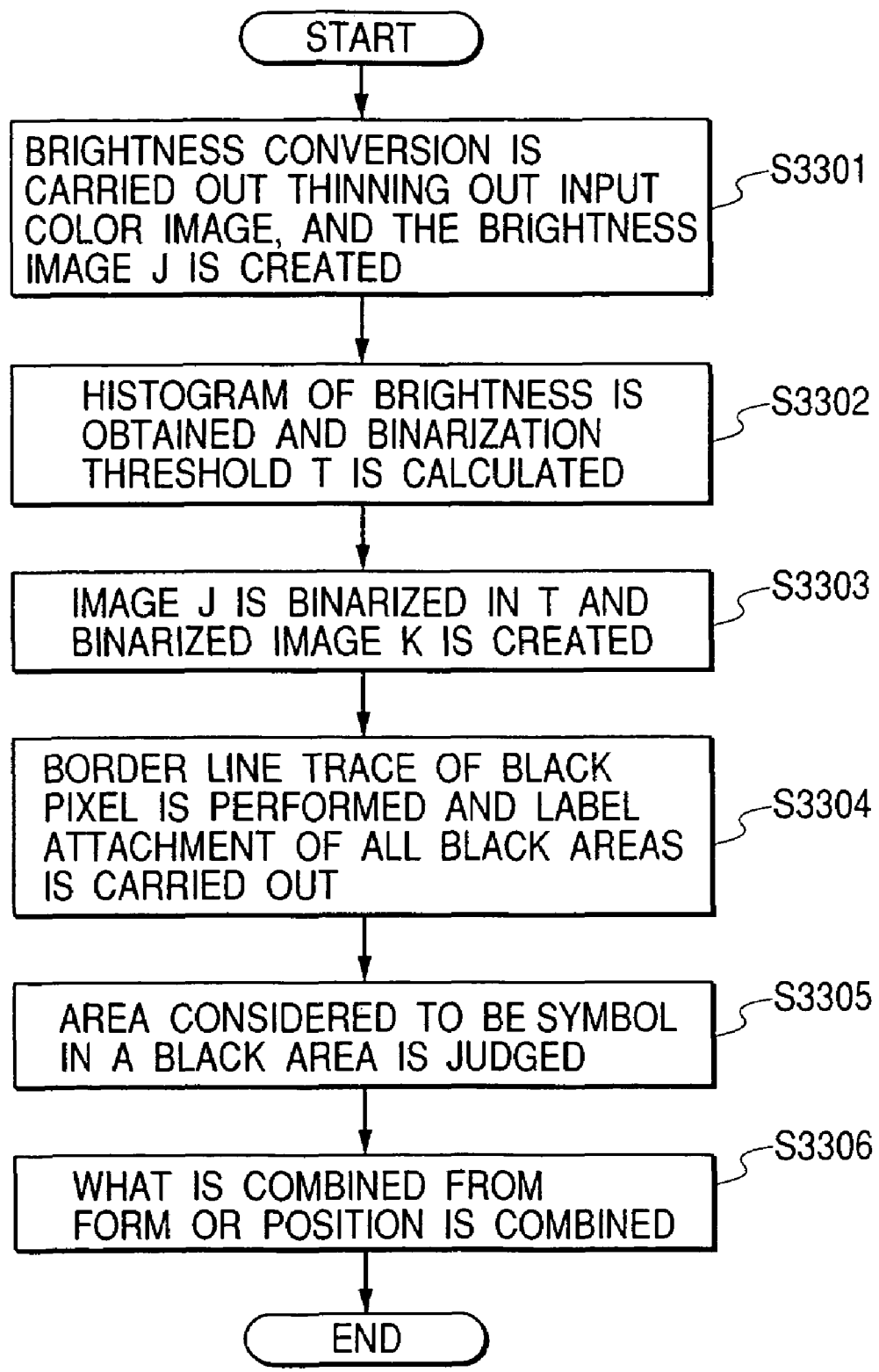
FIG. 27 is a flowchart showing the symbol area detection processing performed according to the fourth embodiment of the present invention.
Figure 28:
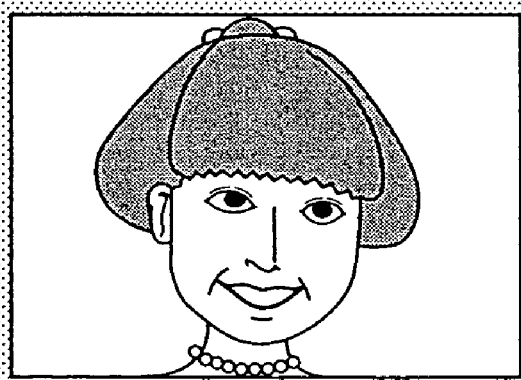
FIG. 28 is a diagram for explaining the symbol embodiment of the present invention.

FIG. 27 is a flowchart for explaining the processing performed by the symbol area detector 3104.

At step S3301, a color image is received and brightness conversion is performed for the color image, while the resolution is reduced by thinning and a brightness image J is obtained. When the original image is, for example, RGB 24 bites at 300 dpi, the operation $$Y=0.299R+0.587G+0.114B$$

is performed for every four pixels vertically and horizontally. The new image J that is obtained is Y8 bits at 75 dpi. At step S3302, the histogram for the brightness data is prepared, and the binary threshold value T is calculated.

At step S3303, the brightness image J is binarized by using the threshold value T, and a binary image K is created. Further, at step S3304, border line tracing is performed for the black pixels, and label attachment is performed for all the black areas. At step S3305, areas that are assumed to be symbols are determined in the black area, and at step S3306 the areas are combined in accordance with their shapes and positions.

An example of this processing will now be described. A color document in FIG. 4 is received, and a histogram in FIG. 5 is obtained by thinning and performing brightness conversion for the color document. By referring to this histogram, the average data and distribution data are employed to calculate the threshold value T (e.g., 150), and a binary image shown in FIG. 6 is obtained. The border line tracing is performed for the black pixels in FIG. 6, and through label attachment, only a group of black pixels, the width or the height of which is equal to or smaller than the threshold value, is identified as a symbol. Then, the group of black pixels in FIG. 7 is determined to be a symbol area. In this example, the image is shown purely for the sake of the explanation and it is not actually created during the symbol area detection process.

Figure 32:
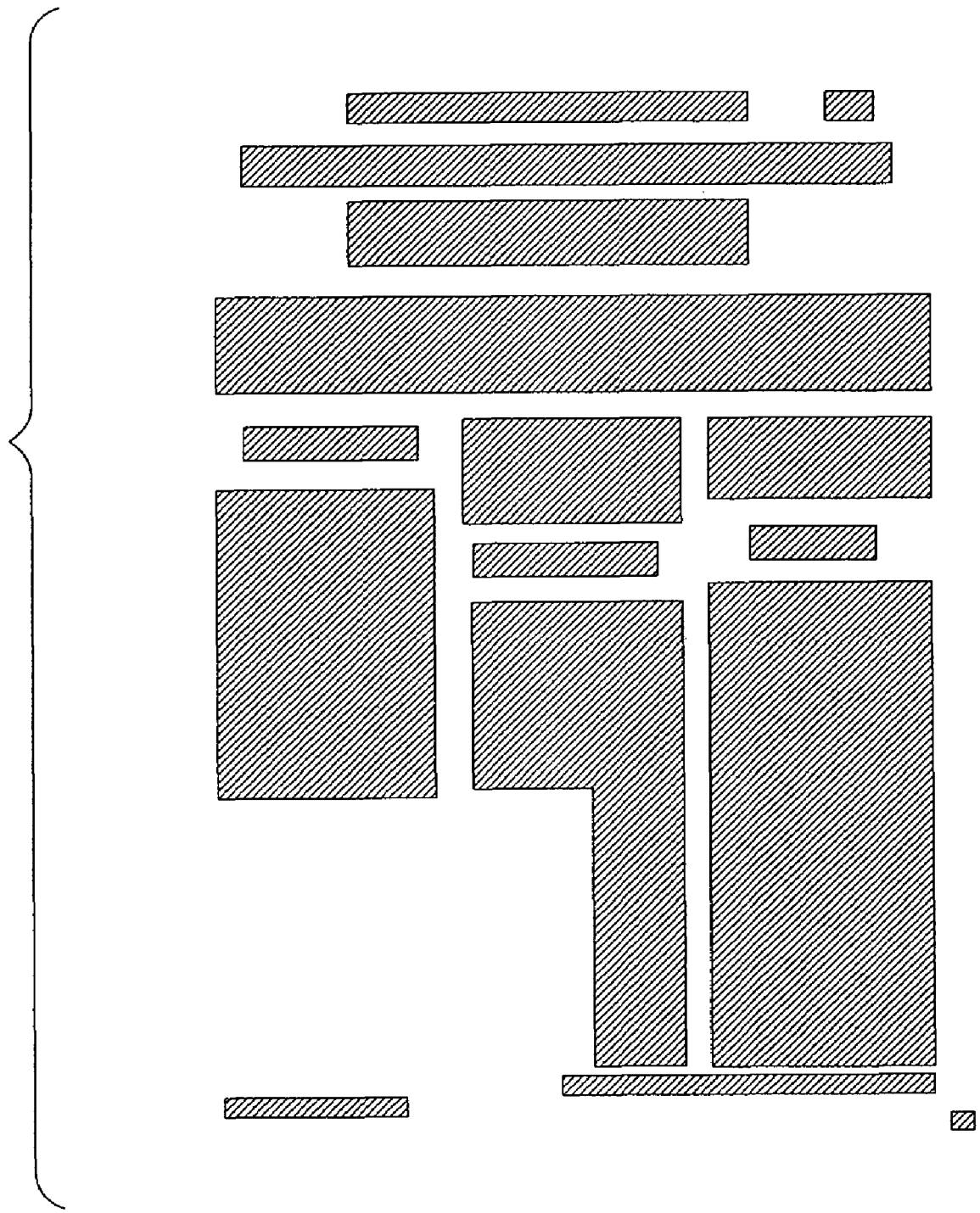
FIG. 32 is a diagram for explaining the symbol area detection processing performed according to the fourth embodiment of the present invention.

When the black pixels are grouped, depending on whether they are positioned closely or whether their widths and heights match, 16 symbol areas shown in FIG. 32 can be detected. The coordinate data for the pixels are stored as symbol area coordinates 3112 in FIG. 25.

Figure 43:
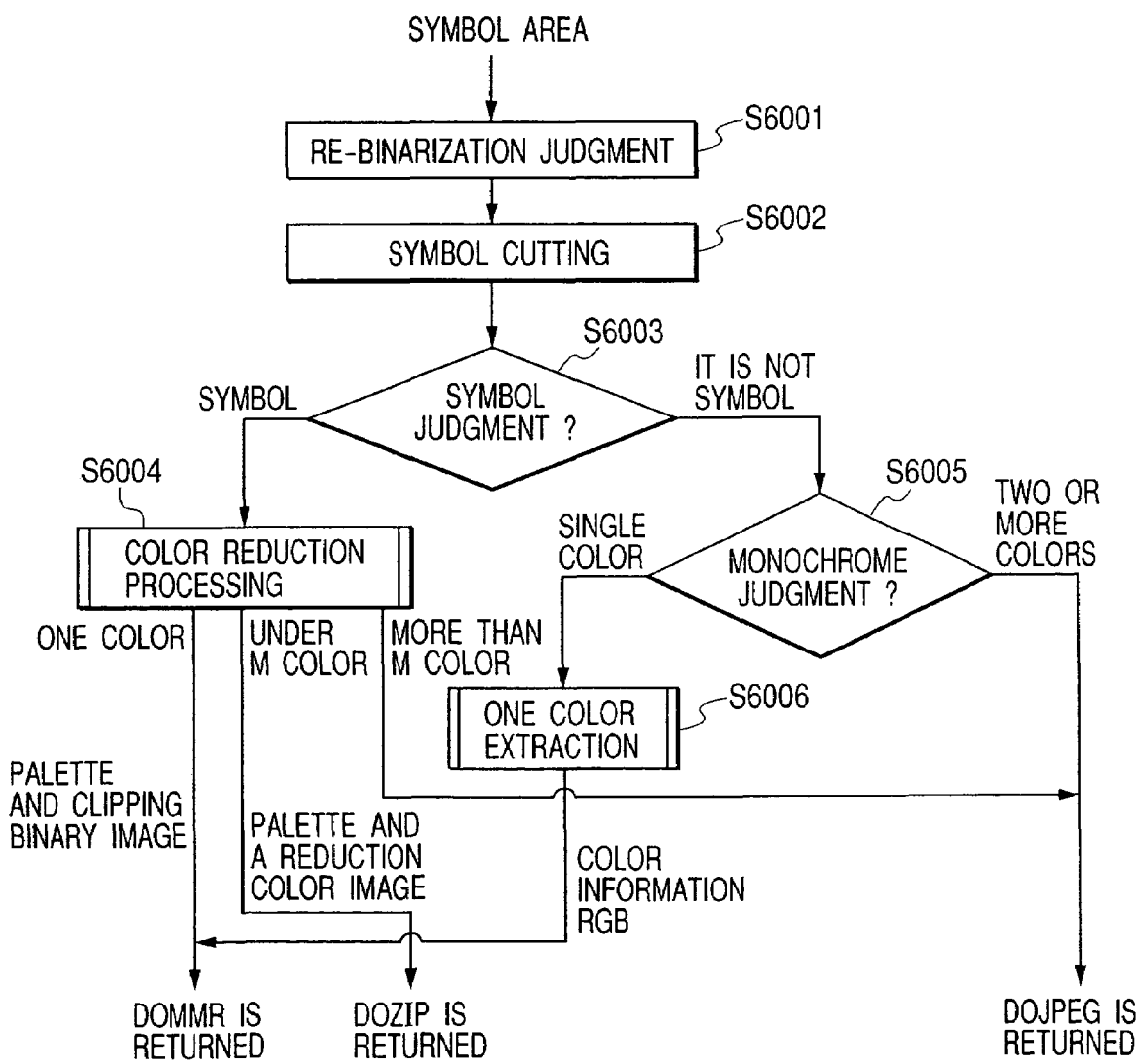
FIG. 43 is a flowchart showing the symbol color extraction processing performed according to the fifth embodiment of the present invention.

Instead of binarizing the color image, by using differential filtering, an edge amount relative to an adjacent pixel may be calculated for all the pixels and binarized, and border line tracing may be performed for the obtained binary image to detect a symbol area. Symbol color extraction process for a symbol area FIG. 43 is a flowchart for the processing performed by the symbol color extraction unit 3108. The complete surface binarized image 103 is employed in this processing; however, only the coordinates of a symbol area and a color image may be received, and the image obtained by binarizing the color image may be employed to perform the representative color operation process.

The processing in FIG. 43 is performed for all the areas that the symbol area detector 3104 determines to be symbol areas.

(Re-binarizing Process)

First, the re-binarization judgement is performed at step S6001.

Figure 29:
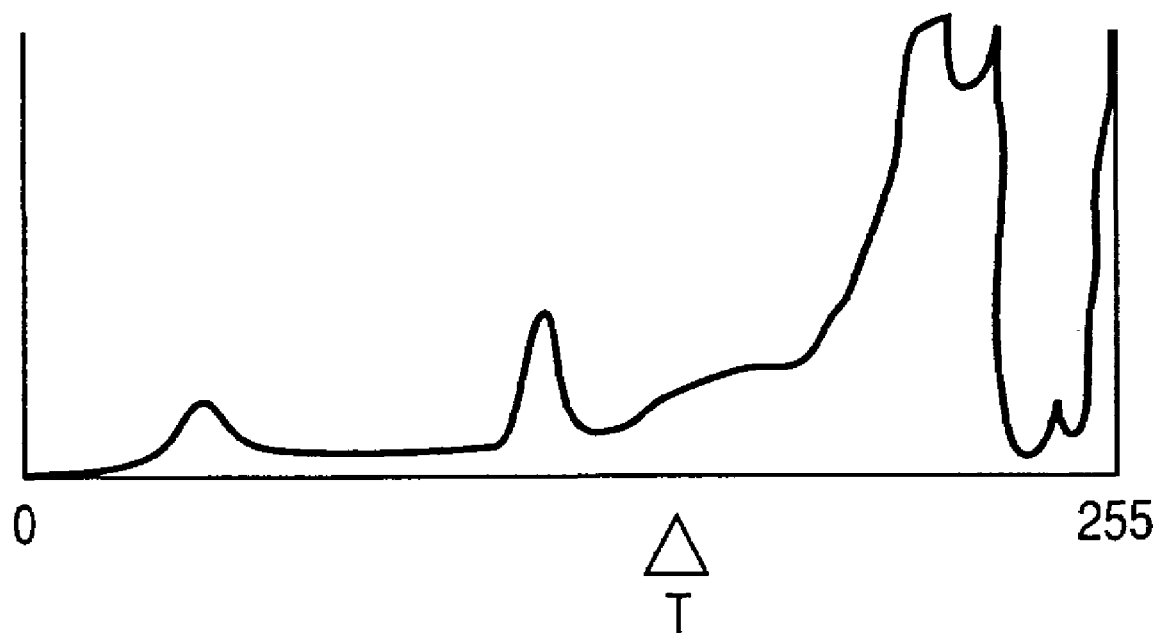
FIG. 29 is a diagram for explaining the symbol area detection processing performed according to the fourth embodiment of the present invention.
Figure 30:
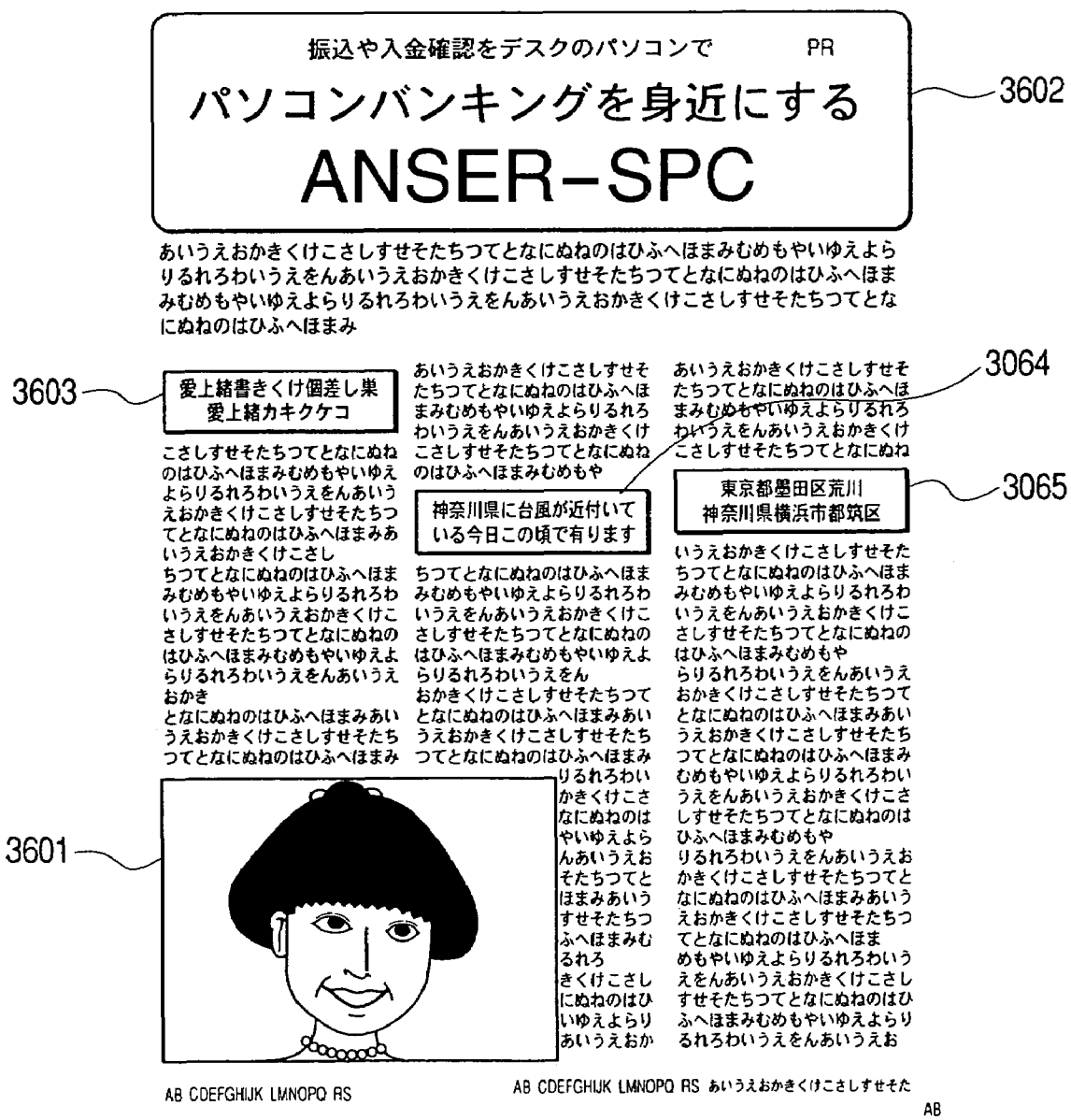
FIG. 30 is a diagram for explaining the symbol area detection processing performed according to the fourth embodiment of the present invention.

The complete surface binarized image 3103 is not always the image obtained by preferably binarizing all the symbol areas. Since the quality of the resultant image is adversely affected, regardless of whether the binary image is too thick or too thin, it is ideal for the optimal binarization to be performed for each symbol area. Since, compared with the complete surface histogram in FIG. 29, a simpler shape shown in FIG. 33 can be expected for the brightness histogram for each symbol area, the threshold value can be easily determined. A portion 3901 is a set of background colors, and a portion 3902 is a set of symbol colors. In this embodiment, in order to reduce the processing time, the re-binarization is performed only for a "too thick binary image" that has a greater effect on the image quality.

Specifically, the symbol area detector 3104 scans the binary image in the area that is determined to be a symbol, and performs pattern matching with an isolated point filter. A check is performed to determine whether the isolated point that is present is equal to or above the threshold value in the area. When the isolated point is equal to or above the threshold value, the brightness histogram for the area is obtained, the optimal threshold value is calculated, and the re-binarization is performed. For a normal symbol area, the brightness histogram need only be partially prepared to obtain a better image; however, in some cases, worse results may be obtained (the image obtained by re-organization may be worse). In order to prevent this phenomenon, the binarized threshold value that is used to obtain the complete surface binary image is entered for the re-binarization, and an exception process is provided in which the re-binarization is not performed when a binary image is obtained that has a greater density than the threshold value for the re-binarization.

(Symbol Cutting Process)

At step S6002, the symbol cutting information is prepared.

The symbol cutting unit changes the process depending on whether the symbol area is a landscape or a portrait view. The symbol area detector determines the landscape or portrait positioning of the symbol portion in accordance with the arrangement of the black blocks, and prepares information indicating whether landscape or portrait positioning is used. When landscape positioning is used for the symbol area, first, the black pixels of the binary image are projected in the main scanning direction. And when the separation between lines is detected, the black pixels are projected for each line in the sub-scanning direction, and the information for each symbol is obtained. When the portrait positioning is used for the symbol area, the line cutting is performed in the sub-scanning direction, and the symbol cutting is performed in the main scanning direction. At this time, it is better for the line cutting to be projected to three segments in the line direction in order to allow the image to be tilted. Through this processing, the coordinate information for each line and the coordinate information for the symbols that are spaced along each line can be obtained.

In the symbol judgement process (step S6003, which will be described later), the symbol cutting information is employed to determine whether each of black object, in an area that the symbol area detector determines to be a symbol, is a symbol. Specifically, whether the black object is a symbol is determined in accordance with its size and shape. While taking image quality and data compression into account, it is not necessarily required that the black object be a symbol in order to convert it into a single color or a multiple color area (for example, because of a higher image quality and a better compression rate can be obtained, a mark having a single, color should be represented by single color MMR rather than the JPEG). However, since it is highly probable that areas other than the symbol area will be represented by gradation, the determination of the object is required.

(Symbol Judgement Process)

The symbol judgement process is performed at step S6003.

During this process, the symbol cutting information (S6002) is entered, and the average symbol size is calculated for each line. When the information for an extremely small symbol is ignored, better results can be obtained. If the object rectangle is extremely larger than the average size, it is determined not to be a symbol, and if the shape of the object does not seem from the aspect ratio to be a symbol in spite of its being of average size, it is also determined not to be a symbol.

When m black objects are present in the area, and when all the m black objects are determined not to be symbols, the symbol judgement unit outputs a determination that the area is an image.

When n black objects (m>n, n≧0) among m black objects are not symbols, i.e., when rectangles that do not indicate symbols remain, a black object on the binary image that is determined not to be a symbol is deleted, and a determination that the pertinent area is a symbol is output.

The following exception process is added while taking into account the final image quality. When five symbols out of ten in an area are represented as single color symbols, and when the other five symbols are regarded as not being symbols and JPEG compression is performed for them, an uneven image is obtained, which visually is not preferable. Thus, for a case wherein the symbol judgement unit frequently changes a determination for either a symbol or an image, in accordance with the arrangement and the frequency at which the rectangle is determined to be a symbol, all the objects are determined to be rectangular symbols, or rectangular images.

When an area is determined to be a symbol during the symbol judgement process, program control advances to step S6004. And when the area is determined not to be a symbol, program control is shifted to step S6005.

(Monochrome Judgement)

The monochrome judgement process is performed at step S6005.

An area to be processed here is an area that is determined by the symbol area detector to be a symbol, but is determined not to be a symbol during the symbol judgement process. As is described above, regardless of whether the area is a symbol, it is better that the monochrome process is performed for the area represented by a single color and that MMR compression be performed for the results, so that a higher image quality and a higher compression ratio are obtained. Thus, a process is performed to determine whether the area is or is not monochrome.

As a specific example, histograms are obtained for the RGB levels of the pixels of a color image that correspond to black portions of the binary image, and when all the distribution values of the histograms are equal to or greater than the threshold value, it is ascertained that the area is monochrome.

When the area is monochrome, program control advances to step S6006 for a one color extraction, and when the area is represented by multiple colors, the processing is terminated.

(One Color Extraction Process)

Figure 36:
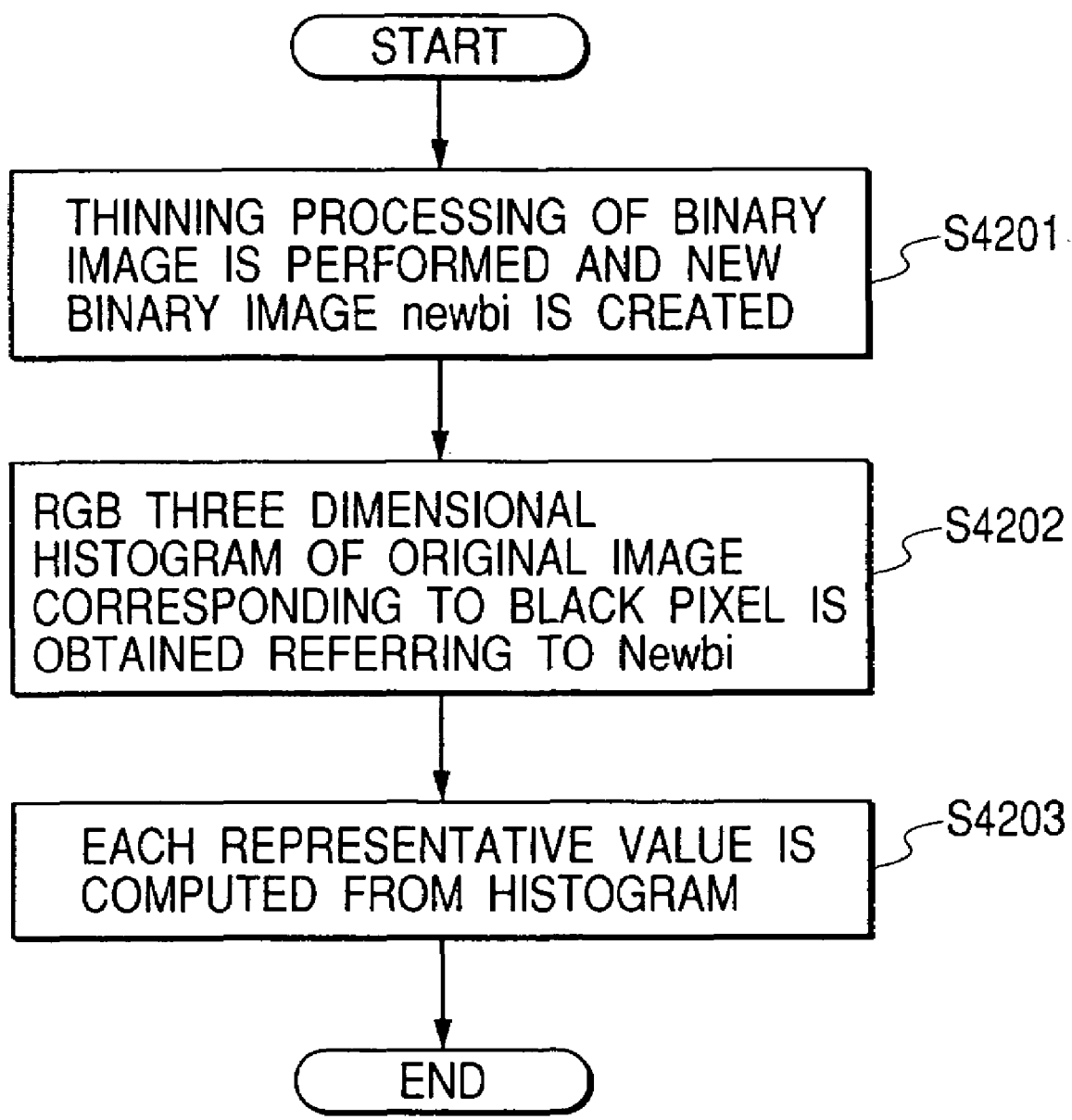
FIG. 36 is a flowchart for explaining the one color extraction processing performed according to the fourth embodiment of the present invention.

The one color extraction process at step S6006 will now be described while referring to the flowchart in FIG. 36.

At step 4202, the thinning process is performed for a binary image newbi that is referred to by symbol coordinates, while the number of black objects in a portion wherein the color is shifted from the background to a symbol portion during scanning is reduced, and a new binary image is created. At step S4203, the histogram is obtained for the RGB values of the original image that corresponds to the black pixels of the image new bi (the histogram for another color space, such as a YUV space, may be prepared). At step S4204, the representative values for RGB are obtained, and in this case, the greatest values may be employed. Or, another method may be employed whereby the greatest value is obtained by using a rough histogram that is prepared using a reduced number of steps, and detailed histograms that are present in the rough histogram are employed to obtain the greatest value.

Figure 37:
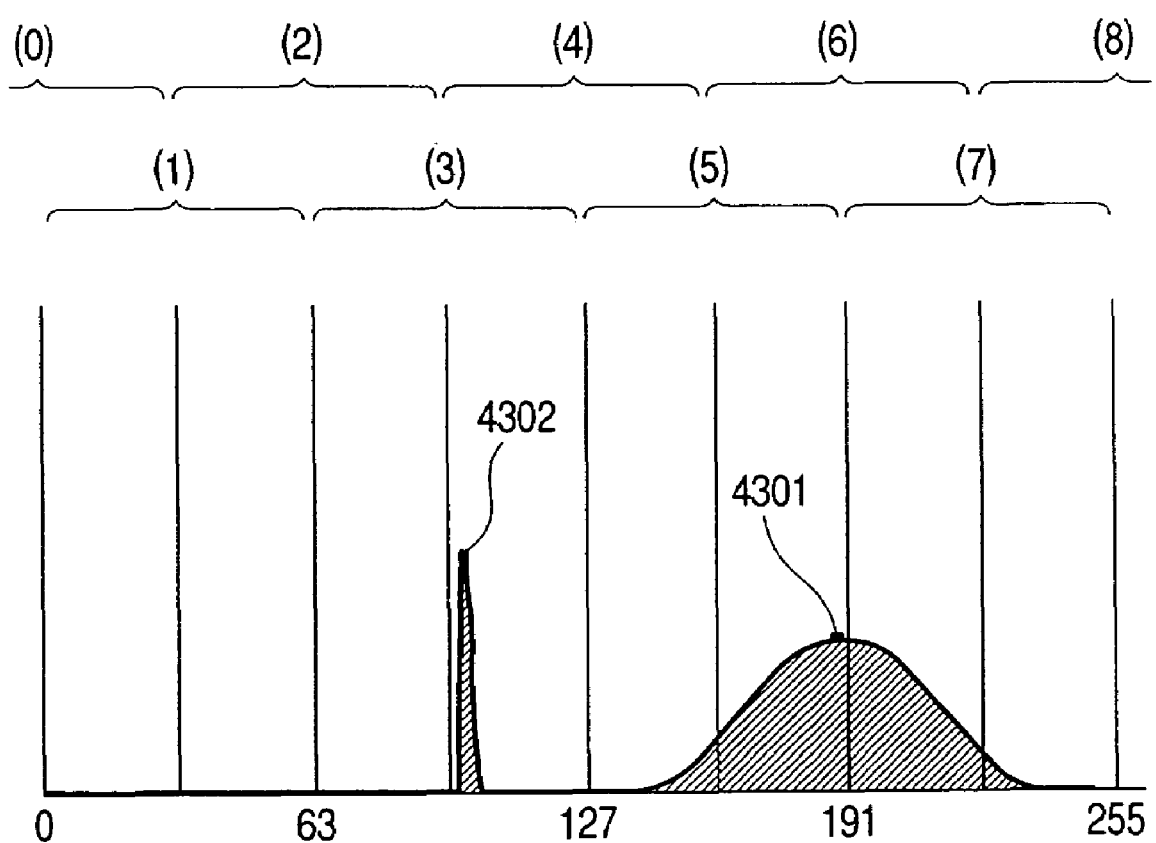
FIG. 37 is a diagram for explaining the one color extraction processing performed according to the fourth embodiment of the present invention.

Using this method, a true representative value 4301 can be obtained from the histogram shown in FIG. 37 without it being disturbed by noise 4302. A detailed explanation will be given while referring to FIG. 37. A detailed histogram of 256 levels in FIG. 37 can be obtained, for example, from R data of eight bits. Since the maximum value is 1302, which is not a true representative value, the histogram is divided by 64 into eight segments that overlap each other, and the eight segments are re-calculated using the histogram for the 256 levels. The obtained segments 0 to 8 are shown; however, segments 0 and 8 each have only 32 levels. It is found through recalculation that a representative value is present in segment 6, and segment 6 is searched to obtain the maximum value 4301. The above processing is repeated for all the symbol coordinates, and one representative color is calculated for each of the symbol coordinates.

(Color Reduction Process)

At step S6004, the color reduction process is performed for the symbol.

In the processing performed by the color reduction unit 4082, even when the original document is represented by a single color, the portion wherein the color is shifted from the background to the symbol portion is present during the scanning.

Figure 46:
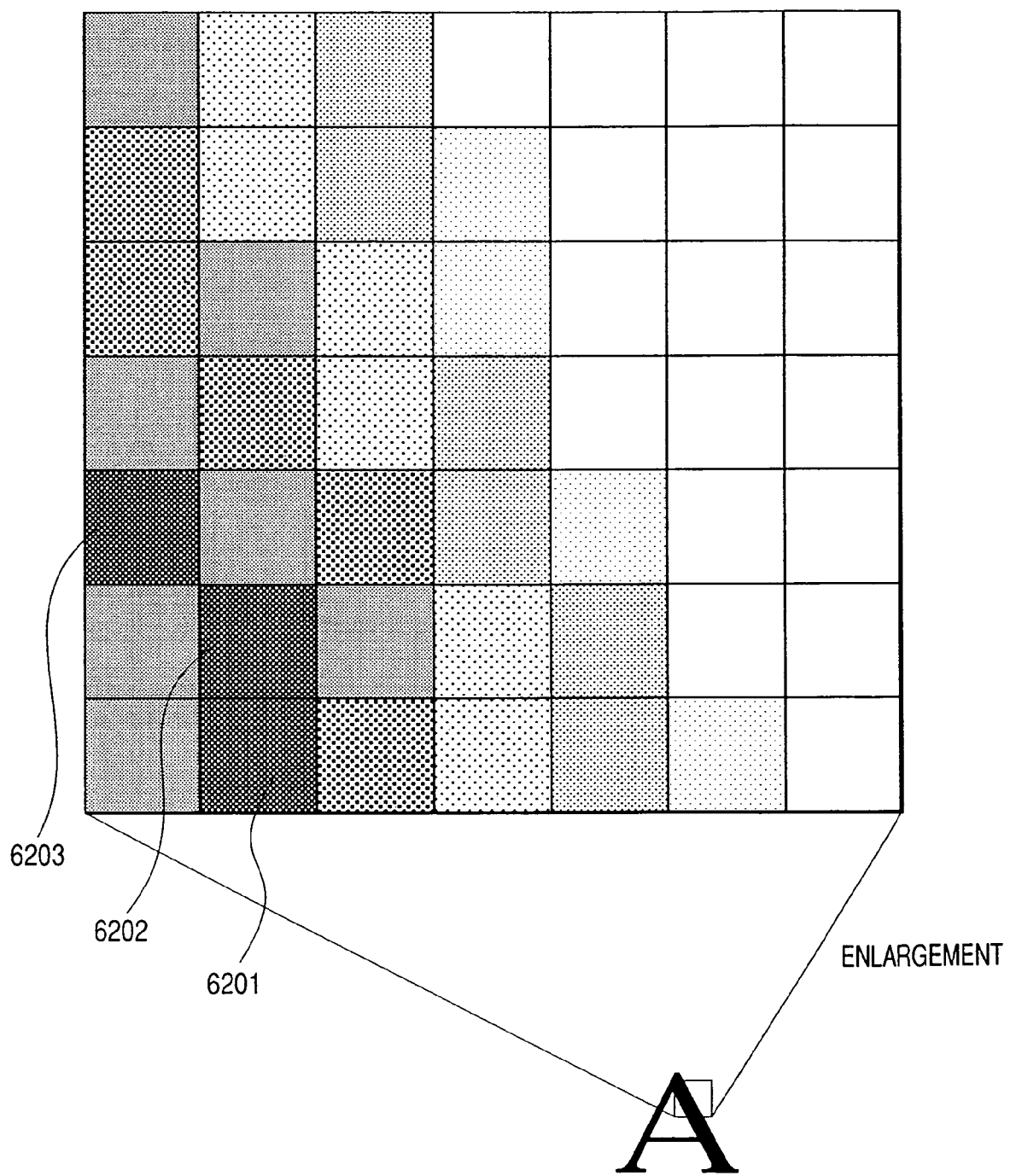
FIG. 46 is a diagram for explaining the shifting portion (gradation) of a symbol that is generated by a scanner.
Figure 49:
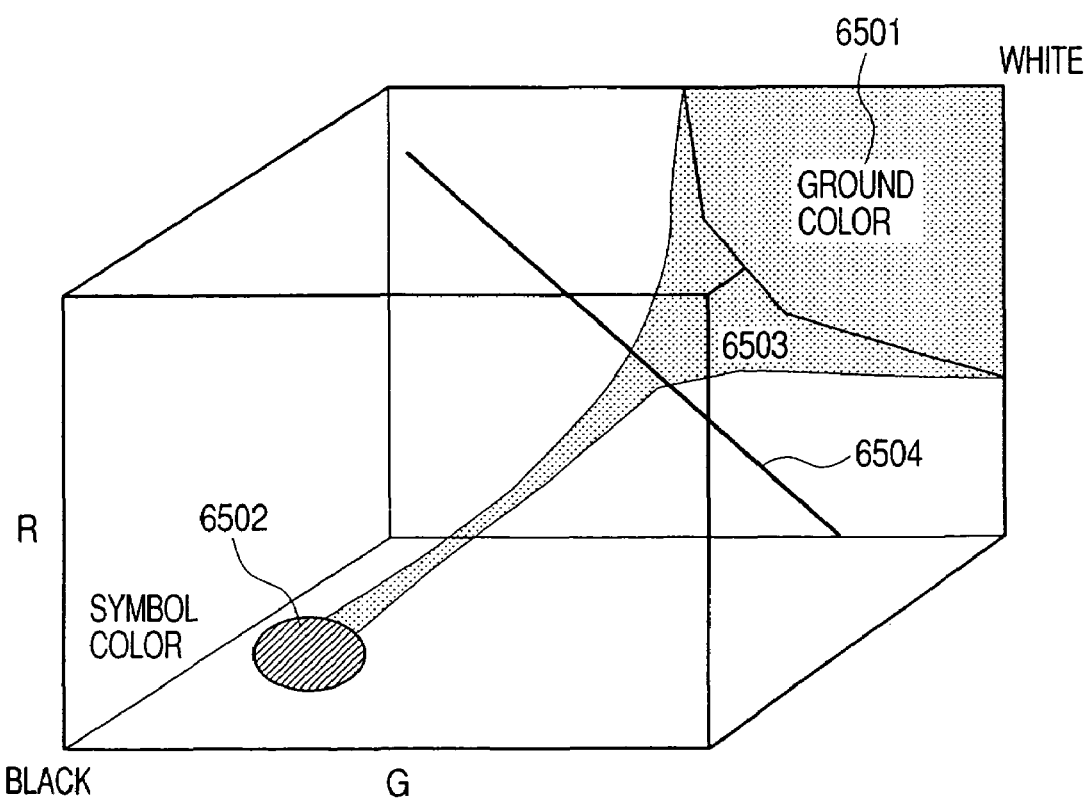
FIG. 49 is a diagram showing a three-dimensional histogram that represents the shifting portion (gradation) of a symbol that is generated by a scanner.

FIGS. 46 and 49 are diagrams showing the color shifting caused by scanning. In FIG. 46, to simplify the explanation, instead of RGB, only R is employed. Symbol A is originally represented by a single color at level R=(32, 32, 32); however, when the symbol A is read by the scanner, the data for this symbol are distributed, as is indicated by enlarged pixels. There are only three pixels 6201, 6202 and 203 that reach the black color that is close to the original level R=(32, 32, 32), and the other pixels are positioned between the background-color (white in this case) and the level R=(32, 32, 32), so that the symbol is represented by a gradation that is a shifting portion. FIG. 49 is a diagram showing the state wherein the color is shifted by using the three-dimensional histogram of the pixel level of the symbol A in FIG. 46. Assume that the background color is white 6501, and the symbol color is black 6502, and a portion 5603 is the shifting portion.

It is not necessary to strictly represent the shifting portion that constitutes a variance due to the scanning of the symbol portion that is originally represented by a single color. When the shifting portion can be represented using only the representative color, a high image quality is obtained, and the amount of data required is reduced. However, even when the thinning process is performed for a binary image, it is difficult for the color of the shifting portion in the symbol area to be completely removed from the background. Therefore, by using the fact that one symbol tends to be represented by a single color, the symbol cutting information is employed to limit the colors to one per symbol, so that the improvement of the image quality and the compression rate is the objective. It should be noted that, when a symbol originally represented by gradation is to be compressed at a high image quality, only one additional exception process, such as a determination as to whether the symbol is represented by multiple colors, need be performed. That is, when one symbol is limited to one color by using the symbol cutting information it is possible to remove the shifting portion that is generated as a variance due to the scanning of a symbol image that originally is represented by a single color.

Figure 44:
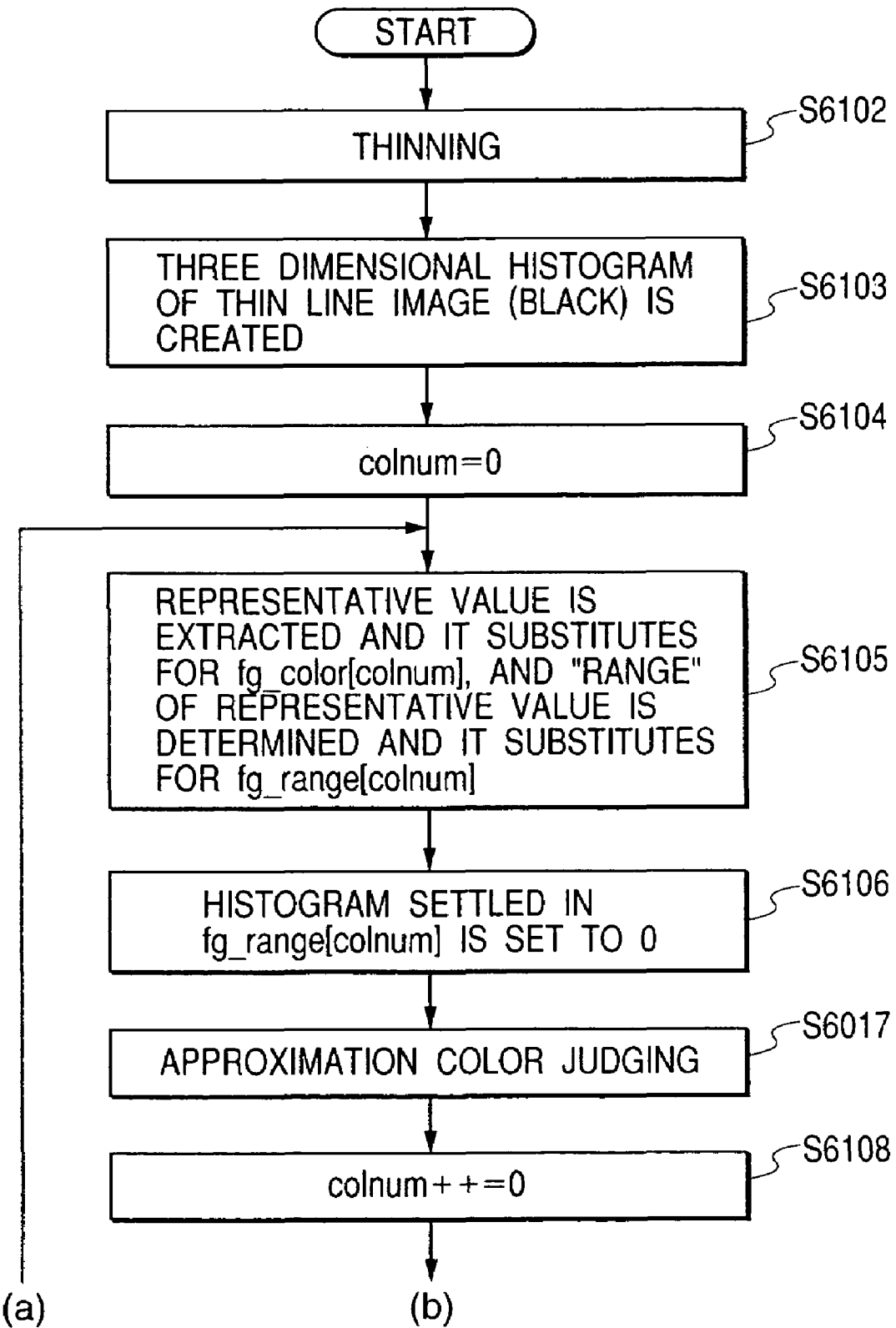
FIG. 44 is a flowchart showing the color reduction processing performed according to the fifth embodiment of the present invention.

The processing performed by the color reduction unit will now be described in detail while referring to the flowchart in FIG. 44.

At step S6102, the thinning process is performed for a binary image that is referred to by the symbol coordinates, and the number of black portions that correspond to the shifting portions whereat the color is shifted from the background to the symbol portion during scanning is reduced, and a new image "thin image" is prepared. Since the binary image "thin image" is used for the process at step S6110, this image is constituted by eight bytes having binary values of 255 (black) and 0 (white). At step S6103, the three-dimensional histogram is obtained for the RGB colors of the original image that corresponds to the black pixel of "thin image". At this time, when, for example, the input image has RGB colors of eight bits each, a 256*256*256 histogram is normally required. While taking into account that it is not the gray level but the resolution that is necessary for the symbol portion, and that a little difference in the pixel values should be ignored in order to calculate the representative color while the variance is reduced during the reading performed by the scanner, the histograms at many such levels is not actually required. Therefore, in this example, a RGB three-dimensional histogram of the upper five bits is obtained. To obtain the histogram, the total number blacknum of black pixels that are present in the symbol area is also calculated.

In this embodiment, the RGB space is employed; however, another color space such as Lab or YUV may also be employed. Further, a three-dimensional histogram is employed; however, three one-dimensional histograms may be employed for the individual colors.

Figure 39:
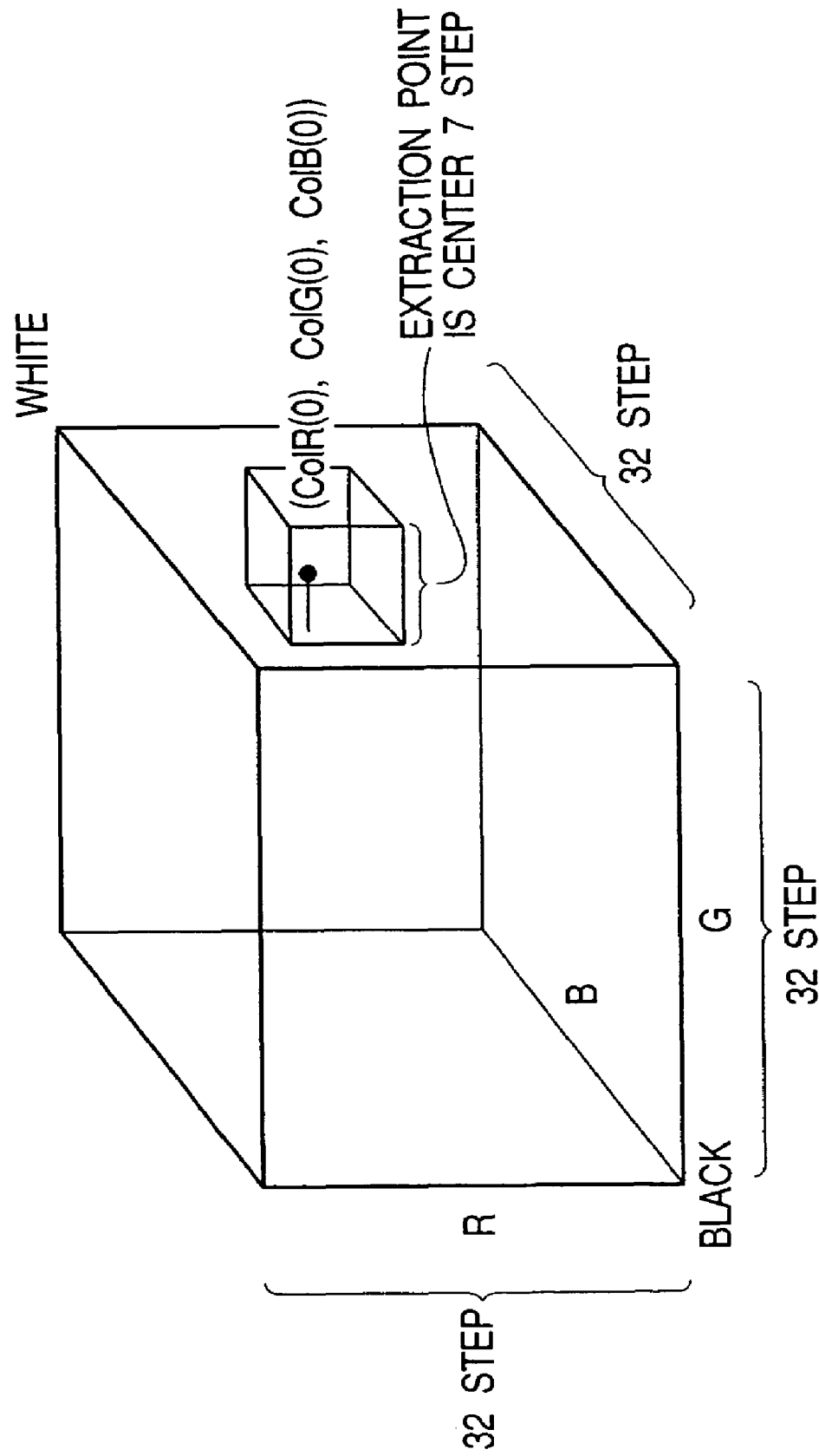
FIG. 39 is a diagram for explaining the color reduction processing performed according to the fourth embodiment of the present invention.

At step S6104, the initial process is performed in which the number colnum of the symbol colors that are represented in the area is reset, or in which the number okpixel of the processed pixels is reset. And at step S6105 the representative value is calculated. In this case, the point whereat the total value of the seven histograms, including the target histogram, reaches the maximum value is employed as a representative value (seven histograms: a target point, two adjacent points in the R dimension, two adjacent points in the G dimension and two adjacent points in the B dimension (see FIG. 39)). The thus obtained maximum value is substituted into color[colnum], colG[colnum], and colB[colnum].

The range, with the representative value as the center, of the color to be converted into the representative value is determined.

Figure 47:
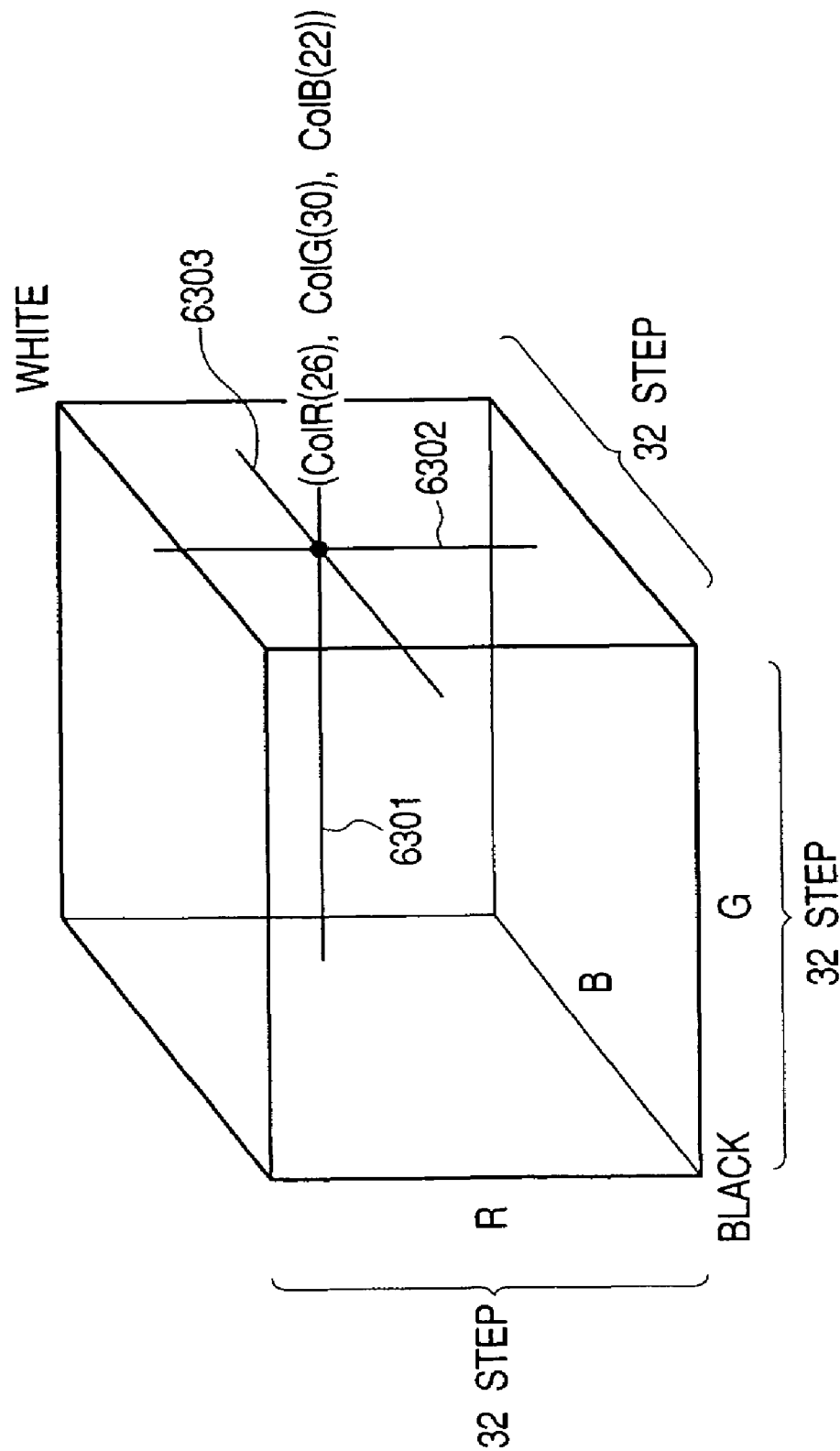
FIG. 47 is a diagram for explaining the color reduction processing performed according to the fifth embodiment of the present invention.
Figure 48:
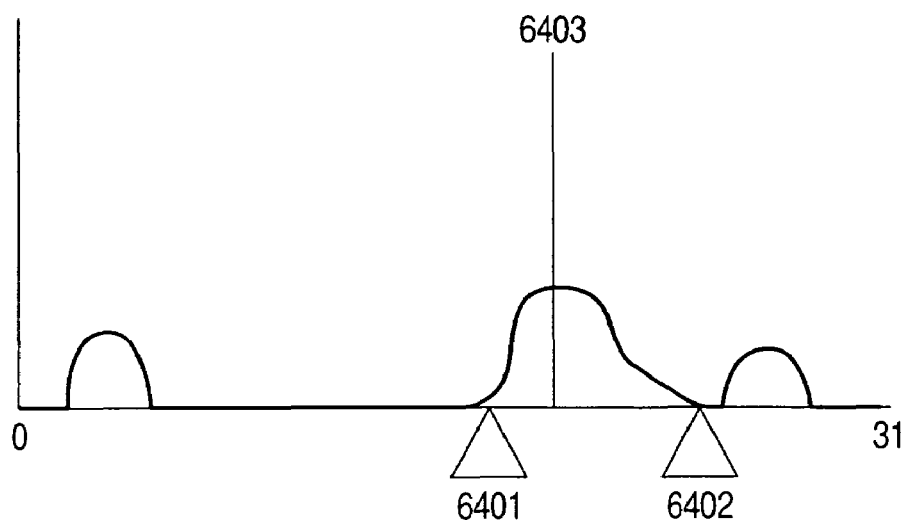
FIG. 48 is a diagram for explaining the color reduction processing performed according to the fifth embodiment of the present invention.

The representative values are fixed to obtain three one-dimensional histograms. FIG. 47 is a diagram showing the three one-dimensional histograms that are obtained. For example, when the representative value is (Color(26), ColG (30), ColB(22), the R one-dimensional histogram (=all the histograms are projected along a line 6301) wherein the three-dimensional histogram G and B are fixed at 30 and 22, the G one-dimensional histogram (=all the histograms are projected along a line 6302) wherein the three-dimensional histogram R and B are fixed at 26 and 22, and the B one-dimensional histogram (=all the histograms are projected along a line 6303) wherein the three-dimensional histogram R and G are fixed at 26 and 30 are obtained. For example, the R one-dimensional histogram has the shape shown in FIG. 48, and points 6401 and 6402 are detected therefrom, and the "R range" is defined wherein these points are used as the representative values. The method for determining a binarized threshold value for an image is employed for the detection of the points 6401 and 6402. While, for example, a point 6403 is a representative value, the histogram including 0 to the representative value is substituted into the binarized threshold value determination function to obtain the point 6401, and the inverted histogram of the histogram including the representative value at step S31 in FIG. 48 is substituted into the binarized threshold value function to obtain the point 6402.

The color range is determined for R, G and B, and is substituted into fg_range[colnum].

At step 6106, all the values of the three dimensional histogram in fg_range[colnum] are set to 0. At this time, the number of pixels that are set to 0 is added to the okpixel that represents the number of processed pixels.

At step S6107 the approximation color judgement is performed. This process is performed for all the colors (from fg_color[0] to fg_color[colnum•1]) that have appeared. When the approximation color is found, the processing loop is exited. As was explained for the symbol cutting, in the image obtained by the scanner, the gradient color occurs between the background color and the symbol color. In other words, as is shown in FIG. 49, a color pixel (6503) is present between the background color (6501) and the symbol color (6502). By referring to the binary image, the color from the line 6504 that is nearer the background color is not added to the three-dimensional histogram (the line 6504 is positioned nearer the symbol color side by thinning the binary image). However, the gradient portion is still present, and the color of this portion would be extracted after the symbol color 6502 has been extracted. For example, while fg_color[0] is (32, 40, 40), (96, 112, 96) tends to be extracted for fg_color [m]. The approximation color judgement is performed in order to determine that these two are the same color. Since this judgement is a little difficult in RGB space that is not a uniform color space, the judgement is performed in the Lab space. When Lab conversion is performed for fg_color[0] (32, 40, 40), (15, −4, −1) is obtained, and when the Lab conversion is performed for fg_color[m]=(96, 112, 96), (45, −9, −7) is obtained.

Through this processing, it is possible to remove the gradient portion that has occurred as a variance when the scanner reads a symbol image that originally is represented by a single color, and high quality image compression can be performed at a high compression rate.

Actually, the background color should also be detected, and the color that is present along the extended line from the background color and fg_color[0] should be determined to be the approximation color. However, in this embodiment, it is assumed that many white portions are included in the background, and when a distance of "ab" in the Lab space is equal to or smaller than the threshold value, the pertinent color is determined to be the approximation color. The determination result is maintained in the kinji[ ] matrix. The colors having the same numbers in kinji[ ] represent the approximation color.

An example is shown below, where kinji[0] and kinji[3] are both 0. That is, fg_color[0] and fg_color[3] are determined to be approximation colors.

fg_color[0] (32, 40, 40) kinji[0]=0
fg_color[1]=(248, 64, 48) kinji[1]=1
fg_color[2]=(48, 256, 32) kinji[2]=2
fg_color[3]=(96, 112, 96) kinji[3]=0

At step S6018 the colnum is incremented.

At step S6019 a check is performed to determine whether the number of black pixels for which color extraction has been completed has exceeded 75% ("75" is merely an example).

That is, a check is performed to determine whether okpixel*75>blacknum*100 is satisfied.

If the number of black pixels has exceeded 75%, program control advances to step S6110. If the number of black pixels has not exceeded 75%, program control is shifted to step S6113.

At step S6110, a palette image is formed in the "thinimage". Specifically, the pixel RGB level of the color_image wherein the value of the "thinimage" corresponds to pixel 255 (indicating color allocation has not yet been performed) is referred to, and when the RGB data is present in fg_range[m], the value of kinji[m]+1 (i.e., a value of 1) is substituted into the pixel value that "thinimage" corresponds to. In this case, instead of kinji[m], kinji[m]+1 is substituted because since a value of 0 is a special number representing a non-symbol portion (background portion), when kinji[m] is 0 it can not be substituted.

When, at step S6110, the palette image is formed in "thinimage", at step S6111 color information charpal for each symbol is prepared from the palette image by using the symbol cutting information.

Figure 50:
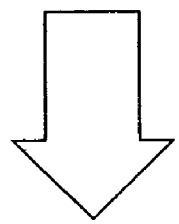
FIG. 50 is a diagram for explaining the color allocation processing performed according to the fifth embodiment of the present invention for determining the color of each symbol using symbol cutting information.

A method for preparing the color information charpal for each symbol cut unit will now be described by using a symbol image in FIG. 50 as an example. In the symbol portion "明日は晴れです。昨日は雨でした。", it is assumed that "晴れ" represents the red extracted by fg_color[1], "雨" is the blue detected by fg_color[2], and the other symbols are black.

In the symbol cutting process, "明" at the beginning of the symbols are processed as the first symbol. Assume that the number of black pixels in the thin-line image "thinimage" present in this symbol is 100, and that 70 pixels out of 100 are present in fg_range[0] and 20 are present in fg_range[3]. Since kinji[0] and kinji[3] are both 0 (approximation colors), a value of 1 is allocated to 90 pixels at step S6110. At this time, when one number occupies the maximum number of existing black pixels, that color is allocated. In this example, ten pixels remain to which color has not yet been allocated, and even if the colors of these pixels are detected, the total number of colors will not exceed 90. Thus, the color information charpal[0] for "明" is determined to be 1.

In this manner, the color allocated to each symbol cut potion is selected from among three charpals, 0 to 2. As a result, as the color information charpal, kinj[1]+1=2 indicates that red is allocated for the left radical of "日" and the right radicals "青" of "晴れ" and "れ"; kinji[2]+1=3 indicates that blue is allocated for "雨"; and kinji[0]+1=1 indicates that black is allocated for the remaining symbols.

When different values uniformly appear in multiple kinji[ ], a symbol tends to be represented by multiple colors. However, this determination is limited to those occasions when the approximation color judgement process functions preferably. Thus, when this function is included, performance of the approximation color judgement process in the Lab space is recommended.

In this example, since the color information charpal is allocated for all the existing twenty symbols, this state matches the condition at step S6113 for exiting the symbol color extraction loop and program control jumps to step S6114. When, however, the color information is allocated to only 18 symbols out of 20, at step S6112, the three-dimensional histogram is again obtained only for those symbols for which charpal was not prepared, and program control returns to step S6105. At this time, the number of black pixels of a thin symbol for which charpal was is not prepared is substituted into blacknum, and "okpixel" is reset. Then, in the above example, since symbol color extraction is completed up to fg_color[3], beginning with fg_color[4] the extraction is performed.

At this time, to increase the processing speed, re-acquisition of the three-dimensional histogram at step S6112 may be performed only one time, and the processes at step S6110 and S6111 may be limited to two repetitions. Experiments have shown that is enough to obtain a satisfactory image quality.

Under the above limitations, when program control exits the loop at step S6113, there could still be a symbol for which charpal has not been processed. Therefore, when the number of symbols nokorichar for which charpal has not been processed is equal to or greater than one, at step S6114, the color information is forcibly allocated to the unprocessed charpal. Specifically, in the allocation process at step S6111, only when the maximum value is obtained is the color information substituted into charpal, while taking into account the succeeding trend of the pixel 255 of "thinimage" (i.e., the pixel for which color extraction has not yet been performed). However, at step S6114, the pixel 255 of "thinimage" is ignored, and the maximum value among the pixels other than 0 (background) is used to determine the value for charpal. Since is a case exists wherein the pixels other than 0 (background) are all 255 (color extraction is not performed even for one pixel), the color of charpal for a symbol positioned nearby is substituted into charpal. For example, when "す" in FIG. 50 corresponds to the conditions in this case, charpal of the nearby positioned "で" is substituted in.

At this time, the numerical value "colnum" is obtained as the number of colors that have been extracted. However, since this value includes the approximation color and also may include a color that is not used, even though it was extracted, the value colnum differs from the number of colors actually used (usecolnum). Thus, at step S6115, the charpal is examined to calculate the number of colors that are actually used.

When, at step S6116, "usecolnum" calculated at step S6115 is equal to or greater than 16, 17 colors including the background (0) are present and can not be represented by four bits. Thus, program control advances to step S6117, the color reduction process for this area is abandoned, and DOJPEG is returned (the area is represented as the background image). It should be noted that when the use of eight bits rather than four bits is permitted, the usecolnum is not 16 but 256.

When usecolnum is one, program control is shifted to step S6118, and a palette of one color is prepared for use. At step S6119, the input binary image is clipped, and at step S6120 DOMMR is returned.

When usecolnum is equal to or greater than two and smaller than 16, program control is shifted to step S6121, the palette of colors to be used Is prepared, and at step S6122, a palette image is created. In this example, when usecolnum is two or three, a palette represented as using two bits for each pixel is created, while when the usecolnum is equal to or greater than four and smaller than 16, a palette represented as using four bits for each pixel is created. At step S6123, DOZIP is returned.

When the thus obtained color reduced image 3109 has one bit (DOMMR is returned as the result of symbol color extraction), the MMR compression unit 3110 performs MMR compression for the image 3109 and prepares the compressed code Y. When the color reduced image 3109 has two or more bits (DOZIP is returned as the result of symbol color extraction), the ZIP compression unit 3111 compresses the image 3109 and prepares the compressed code Z. When DOJPEG is returned, the image 3109 is not transmitted to the MMR compression unit 3110 or the ZIP compression unit 3111, whereat the reduced color image is not present, and a command is transmitted to the symbol portion painting unit 3105 so as not to treat the image as a symbol area.

Symbol Painting Process

Figure 35:
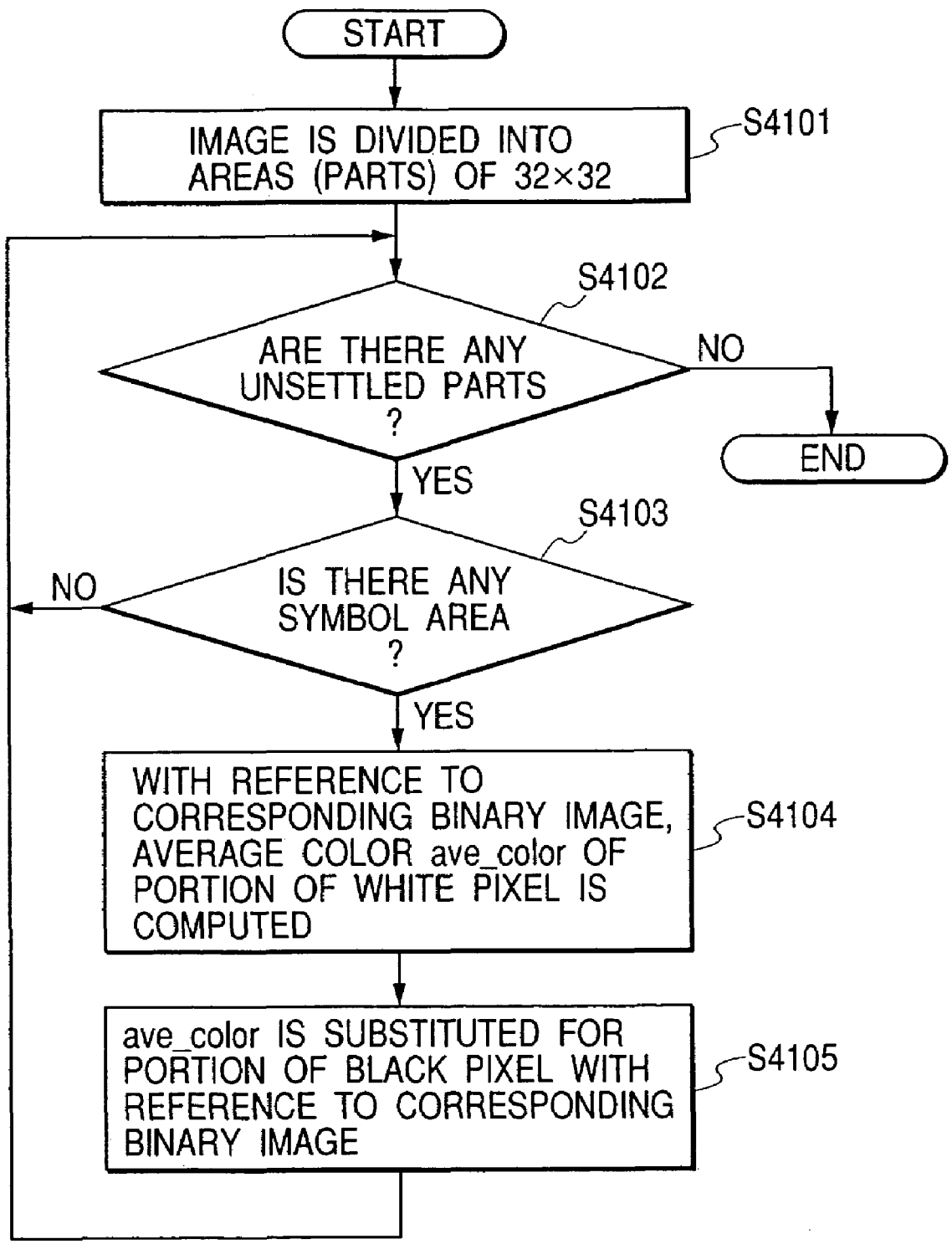
FIG. 35 is a flowchart for explaining the symbol painting processing performed according to the fourth embodiment of the present invention.

The processing performed by the symbol portion painting unit 3104 will now be described while referring to FIGS. 34A to 34C and 35. FIG. 35 is a flowchart showing the symbol portion painting processing.

As an example, assume that the image shown in FIG. 34A, wherein a gradation image is used as a background and blue symbols ABC are drawn substantially in the center, is employed as an original image, and that the binary image of one symbol area shown in FIG. 34B is obtained from the original image. In the symbol portion painting process, first, at step S4101 the entire image is divided into 32×32 areas (hereinafter referred to as parts), and the process is performed for each part. The state obtained during this process is shown in FIG. 34C. To simplify the explanation, 5×5 parts are shown, and the numbers in the upper left portions of the parts indicate the part numbers. The number of parts is not limited to the number used here, and an image may be divided into a different number of parts.

At step S4102, a check is performed to determine whether a part has not been processed. When a part has not been processed, at step S4113, a check is performed to determine whether the target area for the symbol portion painting is present in that part. An area for which the symbol color extraction unit 3108 has returned the DOJPEG is not regarded as a symbol portion painting target, even though that area is determined by the symbol area detector 3104 to be a symbol area.

In the example in FIG. 34C, it is ascertained at step S4103 that there are no symbol portion painting target areas in parts 00 to 04, 10, 14, 20, 24 and 30 to 35, and without performing any process for them, the next part is processed. For the part (e.g., part 1) wherein a symbol portion painting target area is present, at step S4104, by referring to a corresponding binary image, the average value ave_color is calculated for the RGB values (or YUV values) of the color image that corresponds to the white portion of the binary image. Then, at step S4105, the corresponding binary image is referred to, and the pixel density data for corresponding black pixels are determined to be ave_color. The above described processing is repeated for parts (parts 12, 13, 21, 22 and 23) wherein symbol painting target areas are present. As a result, the average value of peripheral pixels can be embedded in the portions wherein the symbol is present.

The obtained image is reduced by the reduction unit 3106. In this embodiment, a simple thinning-out process is employed for size reduction. The reduction process and the symbol portion painting process may invertedly be performed. In this case, position shifting between the binary image and the color image must be taken into account.

Further, if necessary, a format is prepared by collecting the symbol area coordinates 3112, the palette 3114, the compressed code X 3113, the compressed code Y 3115 and the compressed code Z 3116. An example format for collecting these five is the PDF of Adobe (™). The PDF of Adobe is a format that is displayed by the application "Acrobat Reader (™)", which is distributed by Adobe for free, and a problem such as one where a reception side that does not have an application to prepare a document, and thus can not open a file, can be avoided. Another example format is XML. XML is a descriptive language used for the exchange or distribution of documents or data via a network.

Expansion Process

Figure 26:
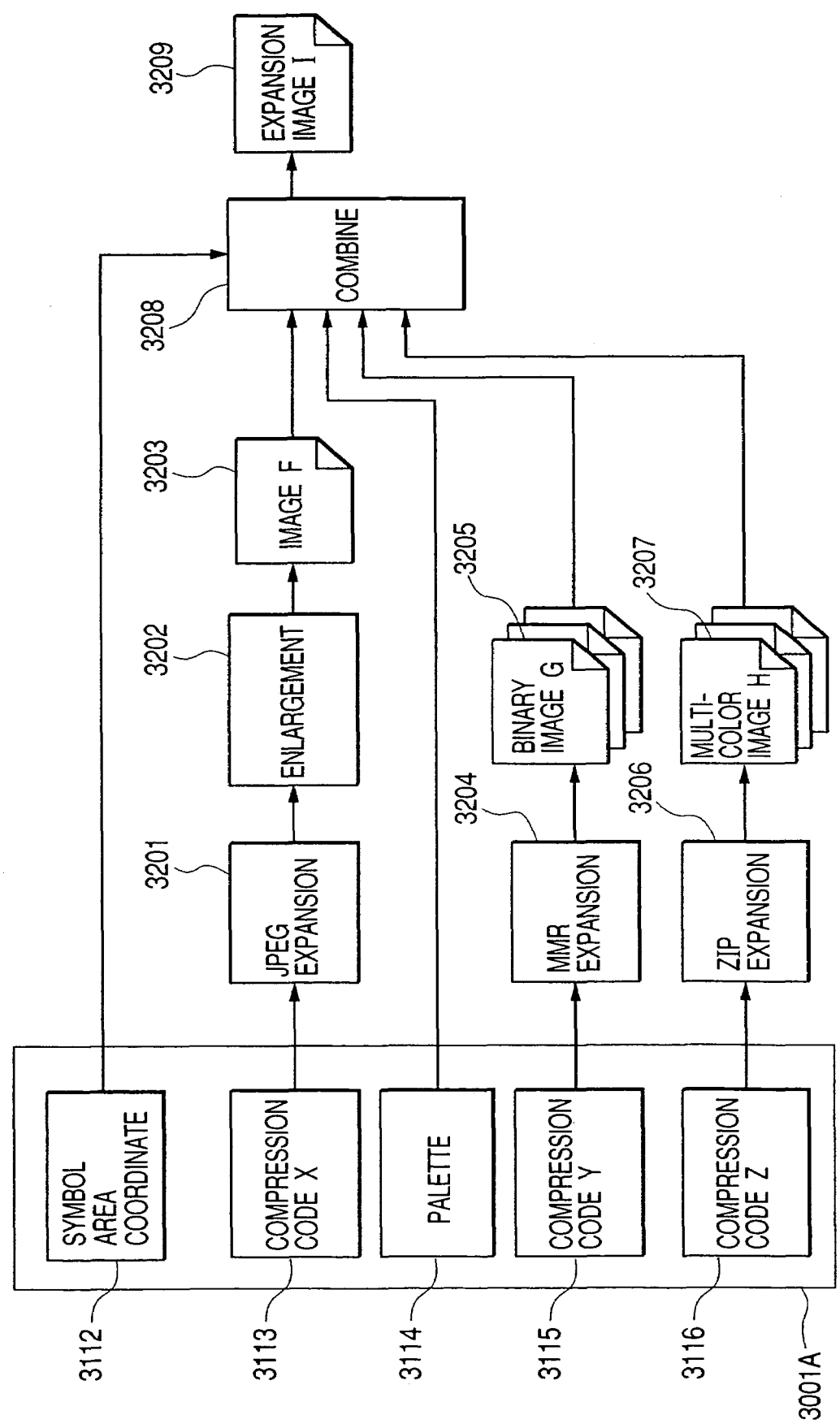
FIG. 26 is a diagram showing the arrangement of the image processing apparatus for expanding compressed data according to the fourth embodiment.

FIG. 26 is a diagram showing the arrangement required for the expansion process.

A JPEG expansion unit 3201 performs JPEG explanation for the received compressed code X 3113, and prepares a multi-valued image E. An enlargement unit 3202 receives the multi-valued image E, and enlarges it to obtain a multi-valued image F 3203. An MMR expansion unit 3204 receives the compressed code Y 3115, and prepares a binary image G 3205. An IP expansion unit 3206 receives the compressed code Z 3116, and creates a multi-color image H 3207. And an image combining unit 3208 receives the symbol area coordinates 3112, and corresponding palette 3114 and binary image G 3205 or multi-color image H 3207; selects the color of the pixel of the image F 3203 when the image data of the binary image or the multi-color image represents transparency, or selects a corresponding palette color in the other case; and creates a final image I 3209.

Figure 38A:
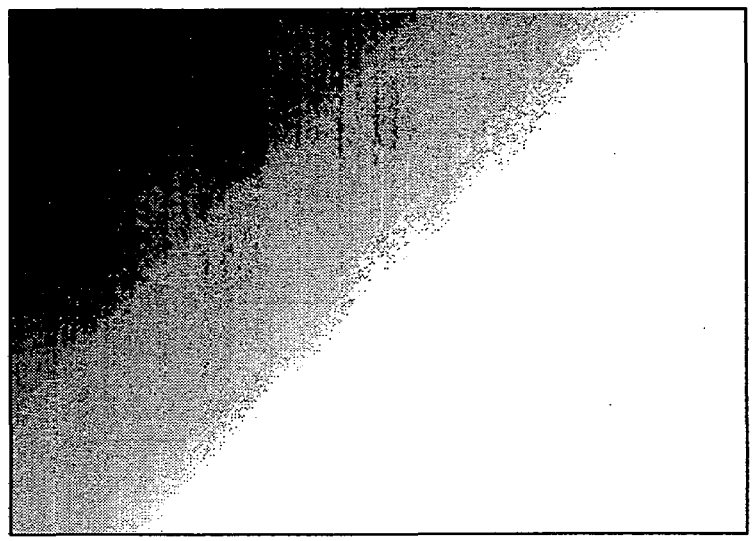
FIGS. 38A, 38B and 38C are diagrams for explaining the state wherein the image processing apparatus of the fourth embodiment expands compressed data and combines the obtained data.
Figure 38B:
Figure 38C:
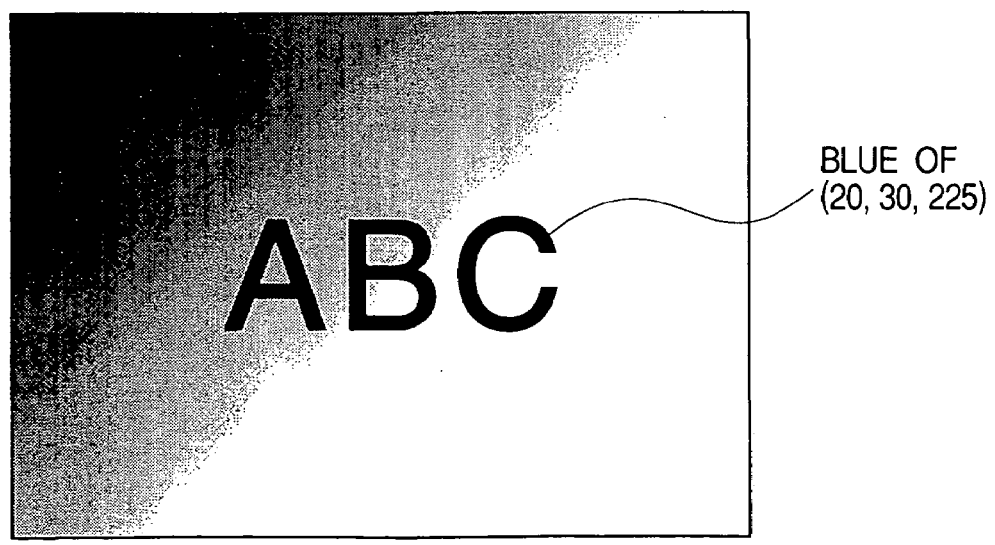

FIGS. 38A to 38C are diagrams showing the results obtained by the combining unit 3208. First, the compressed code C obtained by JPEG expansion is shown in FIG. 38A. For this process, the image in FIG. 34 is employed; however, when the quantization irreversible method for JPEG compression is employed, data are obtained whose pixel value slightly differs from that in FIG. 34C. Compared with a case wherein the original image before the symbol portion is extracted is compressed by JPEG irreversible compression, a change in the pixel value is small when the same quantization table is employed. In other words, a high quality image is obtained. In this embodiment, the binary image obtained by MMR compression is used as the symbol area for which the combining process is to be performed. The binary image obtained by the expansion is shown in FIG. 38B. Assume that the palette for this image is R=20, G=30 and B=225. By referring to the binary image in FIG. 38B, the palette color (20, 30, 255) data are placed on the image portions in FIG. 38A that correspond to black pixels, and finally, the image shown in FIG. 38C is obtained. For a multi-color image, the number of palettes is changed. For example, for two bits, the palettes allocated for four pixel values 00, 01, 10 and 11 are applied. One of the pixels represents transparency, and when, for example, it is 00, the pixel in FIG. 38A is selected for this pixel.

For the pixel value of 01, the palette value of 01 is applied; for the pixel value of 10, the palette value of 10 is applied; and for the pixel value of 11, the palette value of 11 is placed. As a result, the expanded image 3209 is obtained.

<Modification>

In the above embodiments, the binary image is created by using the complete surface single threshold value. However, another threshold value may be employed; for example, an optimal threshold value may be calculated for each symbol area detected by the symbol area detector 3104, and a binary image may be created. In this case, the re-binarization determination process at step S4001 in FIG. 43 is not required.

Further, the same binary image has been used by the symbol portion painting unit 3105 and the symbol color extraction unit 3108; however, the same binary image need not always be used, and an optimal binarizing unit may be internally provided for the units 3105 and 3108.

Figure 33:
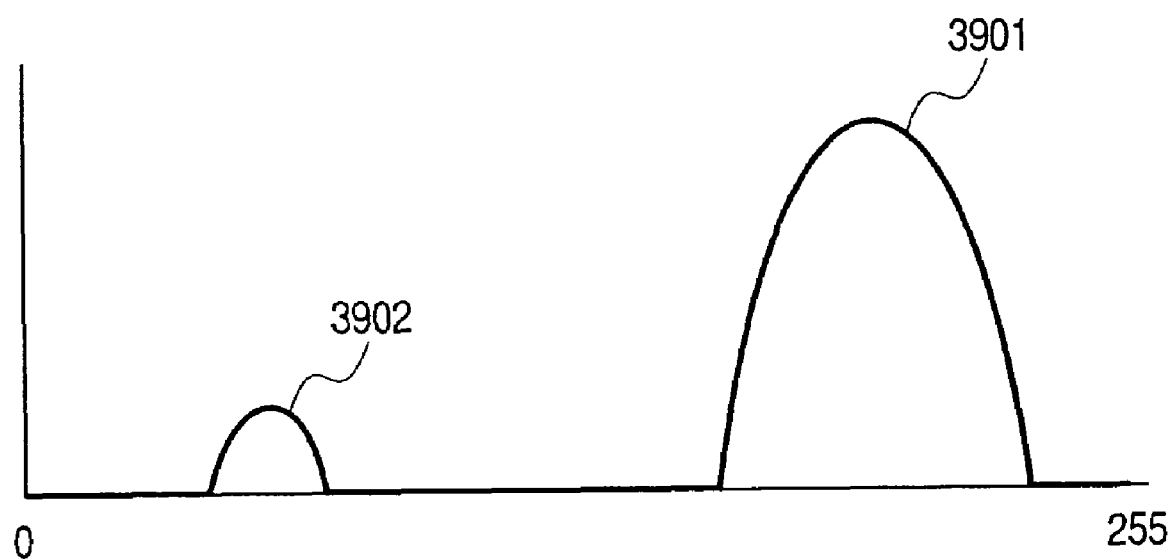
FIG. 33 is a diagram for explaining the processing performed for the re-binarizing a symbol area according to the fourth embodiment of the invention.
Figure 40:
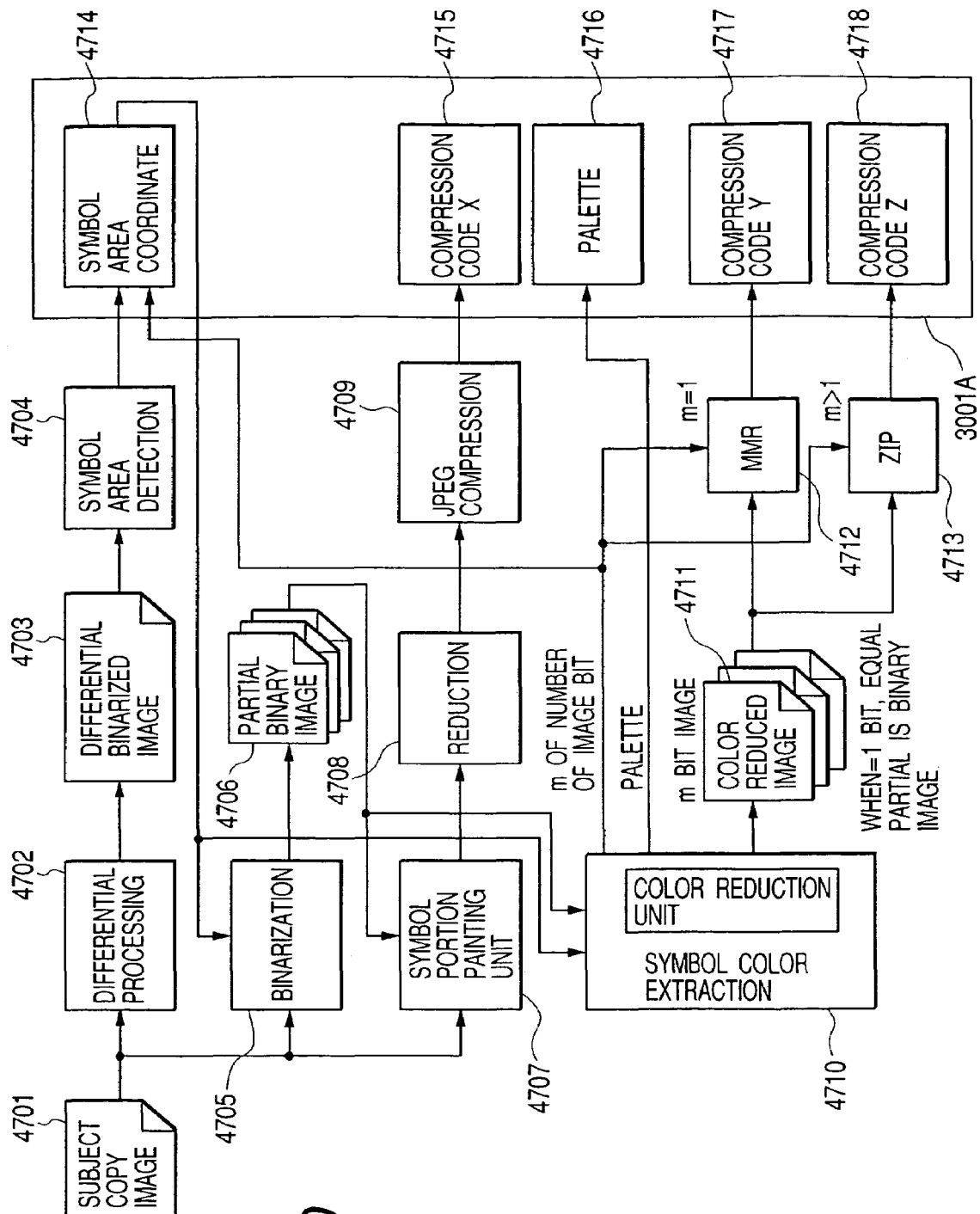
FIG. 40 is a diagram showing the configuration of a modification of the image processing apparatus of the fifth embodiment.
Figure 42A:
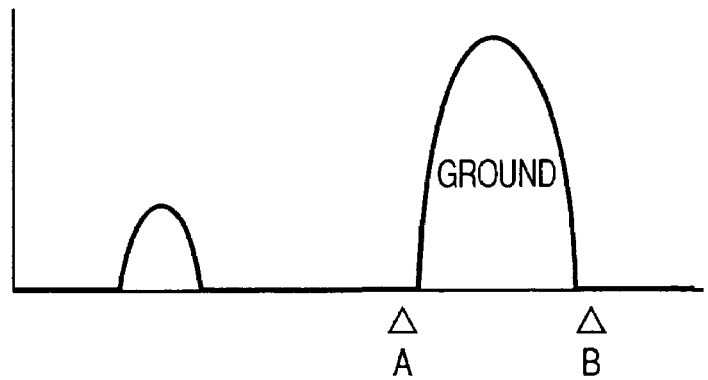
FIGS. 42A, 42B and 42C are diagrams for explaining the processing performed when binarizing a symbol area according to the modification.
Figure 42B:
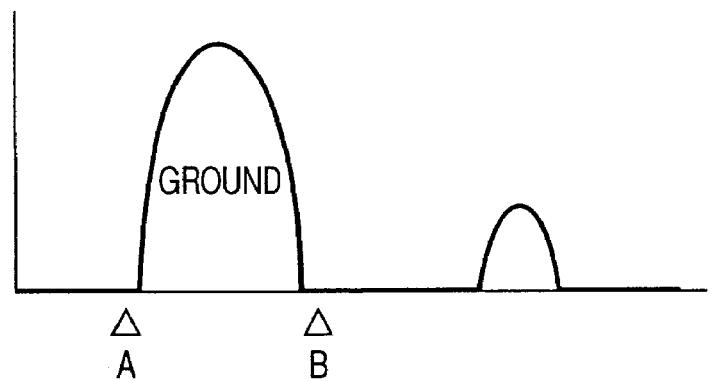
Figure 42C:
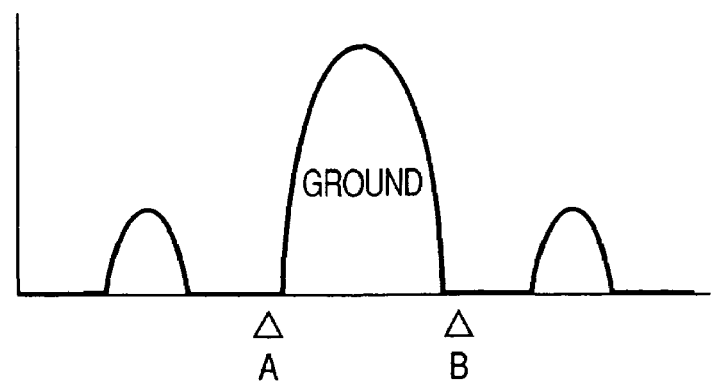

In addition, in the above embodiments, while it is impossible to process a symbol (inverted symbol) having high brightness on a background having low brightness, this process can be performed by using, for example, the arrangement in FIG. 40. A differential processing unit 4702 performs the differential filtering shown in FIGS. 41A and 41B for pixels with a target pixel as the center, and binarizes the pixels in such a manner that, when the absolute value of the pixel value exceeds the threshold value, the pixel is determined to be black, and when the absolute value does not exceed the threshold value, the pixel is determined to be white. The primary differential filter is shown in FIG. 41A. The horizontal line can be detected by the upper portion, while the vertical line can be detected by the lower portion, and the oblique line can be detected by using the total of the absolute values of two filters. Further, the oblique line filter may also be employed. A secondary differential filter that copes with all the directions is shown in FIG. 41B. The secondary differential filter can also be prepared for horizontal detection and vertical detection. This filter is positioned for all the pixels, and a differential image 4702 is created. At this time, when the filtering is performed while thinning the pixels, the resolution can be reduced at the same time. When the process beginning at step S3303 in FIG. 27 is performed for the thus obtained binary image, the coordinates of a symbol area that includes an inverted symbol can also be detected. To also extract the inverted symbol as a symbol area, the binarizing unit 4703 must cope with this process. When the inverted symbol area is extracted as a symbol area, mainly the pattern in FIG. 42 is received, while it has been assumed in the above embodiments that only the pattern in FIG. 33 is received. The case in FIG. 42B is for the inverted symbol, and the case in FIG. 42C is where symbols of two colors, a black symbol and a white symbol, are present in the same gray background. While taking these three patterns into consideration, the binarizing unit 4703 need only detect points A and B and perform the binarization process, so that the area sandwiched between the points A and B is white and the other area is black. Or, disregarding the case in FIG. 42C, only one threshold value along which the background and the symbol portion are separated need be detected, and for an inverted pattern, the inversion pattern may be performed. When the inverted symbol area can be coped with in this manner, the inverted symbol area, which remains in the JPEG compressed image in the fourth embodiment, can be smoothed through the symbol potion painting process. As a result, compression efficiency is improved, and the inverted symbol portion can be compressed without a reduction in the resolution or deterioration due to mosquito noise.

The present invention may be employed for a system that is constituted by multiple apparatuses (e.g., a host computer, an interface device, a reader or a printer), or for one apparatus (e.g., a copier or a facsimile machine).

Further, the objective of the invention can also be achieved by supplying, to a system or an apparatus (or a CPU or an MPU), a storage medium (or a recording medium) on which software program code that implements the functions of the embodiments is recorded, and by permitting the system or the apparatus to read and execute the recorded program code. In this case, the program code read from the storage medium provides the functions of the above described embodiments, and the storage medium on which the program code is recorded constitutes the present invention. In addition, with the present invention it is not only possible for the functions of the previous embodiments to be provided by the execution of program code by the computer, but also, the program code can interact with an Operating System (OS) running on a computer, or with another software application, to provide the functions described in the above embodiments.

Furthermore, with the present invention, program code, read from a storage medium, can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

Figure 45:
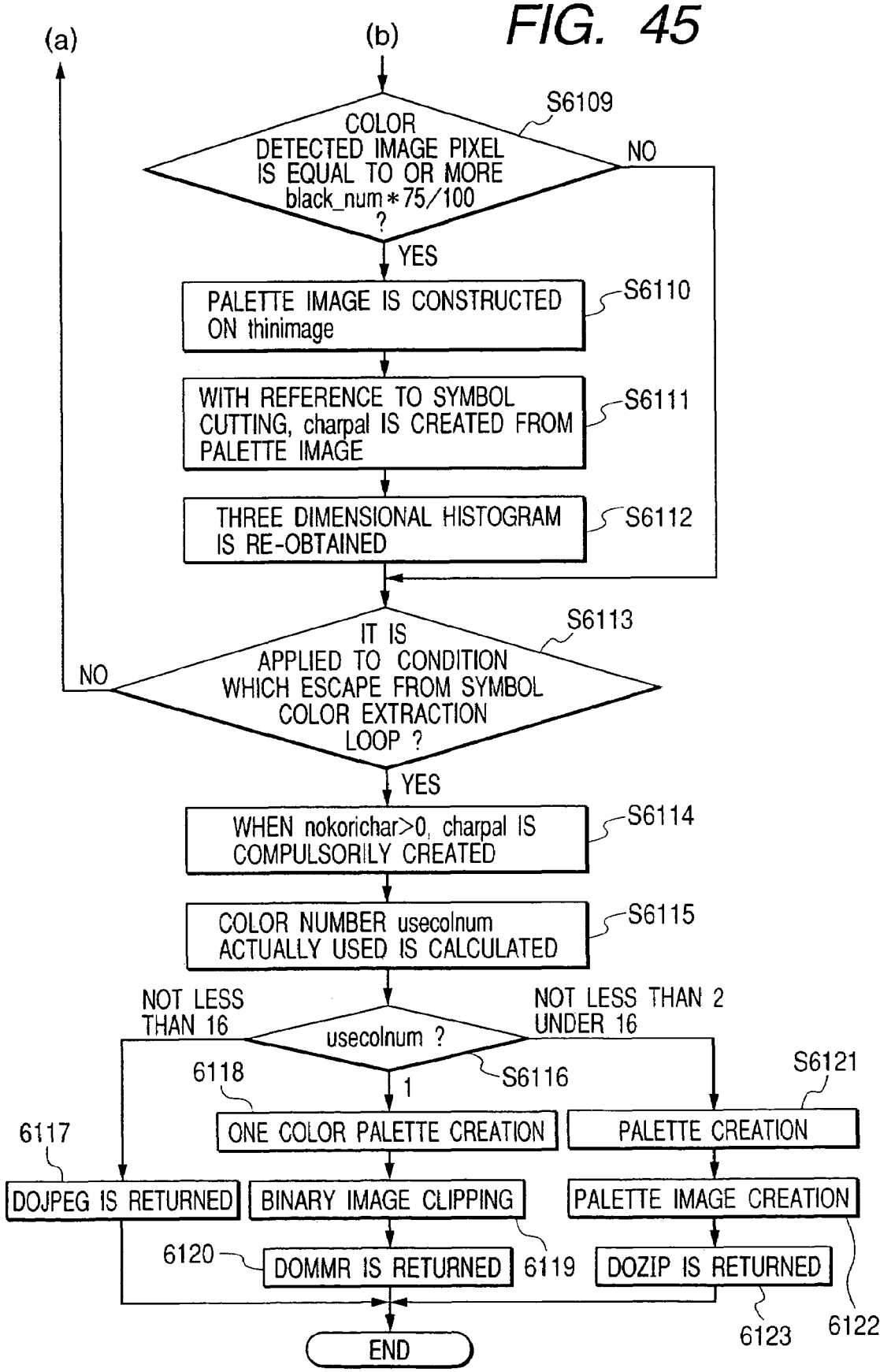
FIG. 45 is a flowchart showing the color reduction processing performed according to the fifth embodiment of the present invention.

When the present invention is applied for the above storage medium, the program codes that correspond to the above described flowcharts (FIG. 43, and/or FIGS. 44 and 45) are stored on the storage medium.

According to the present invention, since one color is allocated for each symbol cut unit, the symbol can be efficiently represented by multiple colors, and when this method is used for the compression system, high quality image compression can be performed at a high compression rate.

What is claimed is:

1. An image processing apparatus comprising:
    binarizing means for binarizing color image data;
    detection means for detecting a symbol area in said color image data;
    color reduction means for obtaining, from N colors that form a symbol in said symbol area, M colors that are equal to or smaller than N;
    symbol cutting means for performing a symbol cutting process for said symbol area; and
    color allocation means for allocating one of said M colors for each symbol cut unit that is obtained by said symbol cutting means.

2. An image processing method comprising the steps of:
    binarizing color image data; detecting a symbol area in said color image data; obtaining, from N colors that form a symbol in said symbol area, M colors that are equal to or smaller than N; performing a symbol cutting process for said symbol area; and allocating one of said M colors for each symbol cut unit that is obtained by said symbol cutting.

3. A computer readable storage medium storing executable commands to perform an image processing method comprising the steps of:

binarizing color image data ;detecting a symbol area in said color image data; obtaining, from N colors that form a symbol in said symbol area, M colors that are equal to or smaller than N; performing a symbol cutting process for said symbol area; and allocating one of said M colors for each symbol cut unit that is obtained by said symbol cutting.

* * * * *

UNITED STATES PATENT AND TRADEMARK OFFICE
CERTIFICATE OF CORRECTION

PATENT NO. : 7,221,790 B2
APPLICATION NO. : 11/246301
DATED : May 22, 2007
INVENTOR(S) : Yukari Toda It is certified that error appears in the above-identified patent and that said Letters Patent is hereby corrected as shown below:

ON THE TITLE PAGE ITEM [30] FAPD:

"Jul. 12, 2005 ............................ 2000/211377" should read
--Jul. 12, 2000 ............................ 2000/211377--.

ON THE TITLE PAGE ITEM [56] REFERENCES CITED:

Other Publications, "Dolan, J.f et al.," should read --Dolan, J.F. et al.,--.

SHEET 8:

Fig. 9, "A PART OF BRIGHTNESS HISTOGRAMS OF CORRESPONDING ORIGINAL IMAGE ARE OBTAINED" should read --A PART OF BRIGHTNESS HISTOGRAMS OF CORRESPONDING ORIGINAL IMAGE IS OBTAINED--.

COLUMN 1:

Line 15, "processing-" should read --processing--; and
Line 50, "example conventional" should read --example of a conventional--.

COLUMN 2:

Line 4, "calculation" should read --calculations--.

COLUMN 4:

Lines 62-64 should be deleted.

Signed and Sealed this

Fourteenth Day of December, 2010

David J. Kappos
*Director of the United States Patent and Trademark Office*

COLUMN 7:

Line 35, "attribute-applies" should read --attribute applies--; and
Line 41, "is" should be deleted.

COLUMN 9:

Line 62, "nature" should read --image--.

COLUMN 13:

Line 1, "Symbol Area Detection Process" should read --(Symbol Area Detection Process)--; and
Line 47, "detect a symbol area. Symbol color extraction process for a symbol area" should read --detect a symbol area.
¶ (Symbol Color Extraction Process for a Symbol Area)--.

COLUMN 16:

Line 11, "new bi" should read --newbi--.

COLUMN 17:

Line 8, "is the objective." should read --are the objectives.--.

COLUMN 18:

Line 5, "histogram" should read --histograms--;
Line 8, "histogram" should read --histograms--; and
Line 11, "histogram" should read --histograms--.

COLUMN 19:

Line 44, " blue " should read --blue--.

COLUMN 20:

Line 43, "is" should be deleted.

COLUMN 21:

Line 7, "Is" should read --is--; and
Line 28, "Symbol Painting Process" should read --(Symbol Painting Process)--.

COLUMN 22:

Line 25, "Expansion Process" should read --(Expansion Process)--.

COLUMN 23:

Line 8, "<Modification>" should read --(Modification)--; and
    Line 67, "potion" should read --portion--.

COLUMN 25:

Line 4, "data ;detecting" should read --data; detecting--.